(12) United States Patent
Akkarakaran et al.

(10) Patent No.: US 11,646,921 B2
(45) Date of Patent: May 9, 2023

(54) USING PHYSICAL CHANNELS FOR POSITIONING MEASUREMENT SIGNALS

(71) Applicant: QUALCOMM Incorporated, San Diego, CA (US)

(72) Inventors: Sony Akkarakaran, Poway, CA (US); Tao Luo, San Diego, CA (US); Junyi Li, Chester, NJ (US); Guttorm Ringstad Opshaug, Redwood City, CA (US); Joseph Binamira Soriaga, San Diego, CA (US); Alexandros Manolakos, San Diego, CA (US); Sven Fischer, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 491 days.

(21) Appl. No.: 16/536,032

(22) Filed: Aug. 8, 2019

(65) Prior Publication Data

US 2020/0053703 A1 Feb. 13, 2020

(30) Foreign Application Priority Data

Aug. 9, 2018 (GR) ............... 20180100379

(51) Int. Cl.
*H04L 27/26* (2006.01)
*G01S 5/06* (2006.01)
(Continued)

(52) U.S. Cl.
CPC ............ *H04L 27/2602* (2013.01); *G01S 5/06* (2013.01); *H04L 5/0048* (2013.01); *H04L 27/261* (2013.01); *H04W 72/23* (2023.01)

(58) Field of Classification Search
None
See application file for complete search history.

(56) References Cited

U.S. PATENT DOCUMENTS

| 10,716,084 B2 | 7/2020 | Wang et al. |
| 2010/0195566 A1* | 8/2010 | Krishnamurthy ..... H04L 5/0007 370/328 |

(Continued)

FOREIGN PATENT DOCUMENTS

| CN | 101483510 A | 7/2009 |
| CN | 101931862 A | 12/2010 |

(Continued)

OTHER PUBLICATIONS

Partial International Search Report—PCT/US2019/046006—ISA/EPO—dated Oct. 29, 2019.

(Continued)

*Primary Examiner* — Hassan A Phillips
*Assistant Examiner* — Gautam Sharma
(74) *Attorney, Agent, or Firm* — MG-IP Law, P.C.

(57) ABSTRACT

Disclosed are techniques for performing positioning operations. In an aspect, a user equipment (UE) receives a downlink physical channel from a base station, the downlink physical channel received via one or more slots of one or more subframes of one or more radio frames, the downlink physical channel carrying user data and/or control information from the base station to the UE, receives, from the base station, an indication that the base station will transmit reference signals for positioning on the downlink physical channel, and performs a positioning measurement of a reference signal received on the downlink physical channel.

25 Claims, 12 Drawing Sheets

(51) Int. Cl.
*H04L 5/00* (2006.01)
*H04W 72/23* (2023.01)

(56) References Cited

U.S. PATENT DOCUMENTS

| | | | |
|---|---|---|---|
| 2010/0260154 A1* | 10/2010 | Frank | G01S 5/10 |
| | | | 370/336 |
| 2011/0086659 A1 | 4/2011 | Yoon et al. | |
| 2012/0040685 A1* | 2/2012 | Escolar-Piedras | G01S 5/10 |
| | | | 455/456.1 |
| 2012/0040696 A1* | 2/2012 | Siomina | H04L 5/0062 |
| | | | 455/456.6 |
| 2012/0231809 A1 | 9/2012 | Siomina et al. | |
| 2013/0294391 A1* | 11/2013 | Guo | H04W 72/042 |
| | | | 370/329 |
| 2014/0185480 A1* | 7/2014 | Lee | H04W 36/30 |
| | | | 370/252 |
| 2015/0011236 A1* | 1/2015 | Kazmi | G01S 5/0226 |
| | | | 455/456.1 |
| 2016/0150376 A1* | 5/2016 | Chiou | H04W 4/025 |
| | | | 455/456.2 |
| 2016/0150548 A1* | 5/2016 | Wu | H04W 72/082 |
| | | | 370/329 |
| 2017/0111880 A1* | 4/2017 | Park | H04W 64/00 |
| 2017/0164225 A1* | 6/2017 | Yu | H04W 24/10 |
| 2017/0214508 A1* | 7/2017 | Lee | H04L 5/0053 |
| 2017/0289831 A1 | 10/2017 | Park et al. | |
| 2017/0289953 A1* | 10/2017 | Chae | G01S 1/02 |
| 2017/0332192 A1* | 11/2017 | Edge | H04W 4/029 |
| 2017/0366244 A1 | 12/2017 | Lee et al. | |
| 2017/0374640 A1 | 12/2017 | Kim et al. | |
| 2018/0007576 A1 | 1/2018 | Lee et al. | |
| 2018/0017661 A1* | 1/2018 | Morioka | H04W 4/02 |
| 2018/0124787 A1 | 5/2018 | Wang et al. | |
| 2018/0220458 A1* | 8/2018 | Ouchi | H04W 74/0808 |
| 2018/0255472 A1 | 9/2018 | Chendamarai et al. | |
| 2018/0324678 A1 | 11/2018 | Chen et al. | |
| 2018/0324738 A1* | 11/2018 | Stirling-Gallacher | |
| | | | G01S 5/0036 |
| 2019/0200202 A1* | 6/2019 | Ko | H04W 88/10 |
| 2019/0261281 A1* | 8/2019 | Jung | H04W 52/146 |
| 2020/0067615 A1* | 2/2020 | Ghanbarinejad | H04B 7/0404 |
| 2020/0367193 A1* | 11/2020 | Cha | H04W 48/10 |

FOREIGN PATENT DOCUMENTS

| | | |
|---|---|---|
| CN | 102422663 A | 4/2012 |
| CN | 102594756 A | 7/2012 |
| CN | 107465497 A | 12/2017 |
| WO | WO-2017200708 A1 | 11/2017 |
| WO | 2018118419 A1 | 6/2018 |
| WO | 2018144781 A1 | 8/2018 |

OTHER PUBLICATIONS

International Search Report and Written Opinion—PCT/US2019/046006—ISA/EPO—dated Dec. 10, 2019.

* cited by examiner

US 11,646,921 B2

USING PHYSICAL CHANNELS FOR POSITIONING MEASUREMENT SIGNALS

CROSS-REFERENCE TO RELATED APPLICATIONS

The present Application for Patent claims priority under 35 U.S.C. § 119 to Greek Patent Application No. 20180100379, entitled "USING PHYSICAL CHANNELS FOR POSITIONING REFERENCE SIGNALS," filed Aug. 9, 2018, assigned to the assignee hereof, and expressly incorporated herein by reference in its entirety.

INTRODUCTION

Aspects of this disclosure relate generally to telecommunications, and more particularly to using physical channels for positioning measurement signals and the like.

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long-Term Evolution (LTE) or WiMax). There are presently many different types of wireless communication systems in use, including Cellular and Personal Communications Service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (referred to as "5G," "New Radio," "NR," or "5G NR") mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. As such, the following summary should not be considered an extensive overview relating to all contemplated aspects, nor should the following summary be regarded to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of performing positioning operations includes receiving, at a user equipment (UE), a downlink physical channel from a base station, the downlink physical channel received via one or more slots of one or more subframes of one or more radio frames, the downlink physical channel carrying user data and/or control information from the base station to the UE, receiving, at the UE from the base station, an indication that the base station will transmit reference signals for positioning on the downlink physical channel, and performing, by the UE, a positioning measurement of a reference signal received on the downlink physical channel.

In an aspect, a method of performing positioning operations includes receiving, at a UE, a downlink physical channel from a base station, the downlink physical channel received via one or more slots of one or more subframes of one or more radio frames, the downlink physical channel carrying user data and/or control information from the base station to the UE, performing, by the UE, a first set of positioning measurements of the downlink physical channel during a first averaging duration, the first averaging duration comprising a first group of slots of the plurality of slots, performing, by the UE, a second set of positioning measurements of the downlink physical channel during a second averaging duration, the second averaging duration comprising a second group of slots of the plurality of slots, calculating, by the UE, a first combined positioning measurement for the first set of positioning measurements of the downlink physical channel and a second combined positioning measurement for the second set of positioning measurements of the downlink physical channel; and reporting, by the UE, the first combined positioning measurement and the second combined positioning measurement to a network entity with which the UE is performing a positioning session.

In an aspect, an apparatus for performing positioning operations includes a transceiver of a UE configured to receive a downlink physical channel from a base station, the downlink physical channel received via one or more slots of one or more subframes of one or more radio frames, the downlink physical channel carrying user data and/or control information from the base station to the UE, receive, from the base station, an indication that the base station will transmit reference signals for positioning on the downlink physical channel, and perform a positioning measurement of a reference signal received on the downlink physical channel.

In an aspect, an apparatus for performing positioning operations includes a transceiver of a UE configured to receive a downlink physical channel from a base station, the downlink physical channel received via one or more slots of one or more subframes of one or more radio frames, the downlink physical channel carrying user data and/or control information from the base station to the UE, perform a first set of positioning measurements of the downlink physical channel during a first averaging duration, the first averaging duration comprising a first group of slots of the plurality of slots, and perform a second set of positioning measurements of the downlink physical channel during a second averaging duration, the second averaging duration comprising a second group of slots of the plurality of slots, and at least one processor of the UE configured to calculate a first combined positioning measurement for the first set of positioning measurements of the downlink physical channel and a second combined positioning measurement for the second set of positioning measurements of the downlink physical channel, and cause the transceiver to report the first combined positioning measurement or the second combined positioning measurement to a network entity with which the UE is performing a positioning session.

In an aspect, a non-transitory computer-readable medium storing computer-executable instructions for performing positioning operations includes computer-executable instructions comprising at least one instruction instructing a UE to receive a downlink physical channel from a base station, the downlink physical channel received via one or more slots of one or more subframes of one or more radio frames, the downlink physical channel carrying user data and/or control information from the base station to the UE, at least one instruction instructing the UE to receive, from the base station, an indication that the base station will transmit reference signals for positioning on the downlink physical channel, and at least one instruction instructing the UE to perform a positioning measurement of a reference signal received on the downlink physical channel.

In an aspect, a non-transitory computer-readable medium storing computer-executable instructions for performing positioning operations includes computer-executable instructions comprising at least one instruction instructing a UE to receive a downlink physical channel from a base station, the downlink physical channel received via one or more slots of one or more subframes of one or more radio frames, the downlink physical channel carrying user data and/or control information from the base station to the UE, at least one instruction instructing the UE to perform a first set of positioning measurements of the downlink physical channel during a first averaging duration, the first averaging duration comprising a first group of slots of the plurality of slots, at least one instruction instructing the UE to perform a second set of positioning measurements of the downlink physical channel during a second averaging duration, the second averaging duration comprising a second group of slots of the plurality of slots, at least one instruction instructing the UE to calculate a first combined positioning measurement for the first set of positioning measurements of the downlink physical channel and a second combined positioning measurement for the second set of positioning measurements of the downlink physical channel, and at least one instruction instructing the UE to report the first combined positioning measurement or the second combined positioning measurement to a network entity with which the UE is performing a positioning session.

In an aspect, an apparatus for performing positioning operations includes a means for communicating of a UE configured to receive a downlink physical channel from a base station, the downlink physical channel received via one or more slots of one or more subframes of one or more radio frames, the downlink physical channel carrying user data and/or control information from the base station to the UE, receive, from the base station, an indication that the base station will transmit reference signals for positioning on the downlink physical channel, and perform a positioning measurement of a reference signal received on the downlink physical channel.

In an aspect, an apparatus for performing positioning operations includes a means for communicating of a UE configured to receive a downlink physical channel from a base station, the downlink physical channel received via one or more slots of one or more subframes of one or more radio frames, the downlink physical channel carrying user data and/or control information from the base station to the UE, perform a first set of positioning measurements of the downlink physical channel during a first averaging duration, the first averaging duration comprising a first group of slots of the plurality of slots, and perform a second set of positioning measurements of the downlink physical channel during a second averaging duration, the second averaging duration comprising a second group of slots of the plurality of slots, and a means for processing of the UE configured to calculate a first combined positioning measurement for the first set of positioning measurements of the downlink physical channel and a second combined positioning measurement for the second set of positioning measurements of the downlink physical channel, and cause the means for communicating to report the first combined positioning measurement or the second combined positioning measurement to a network entity with which the UE is performing a positioning session.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
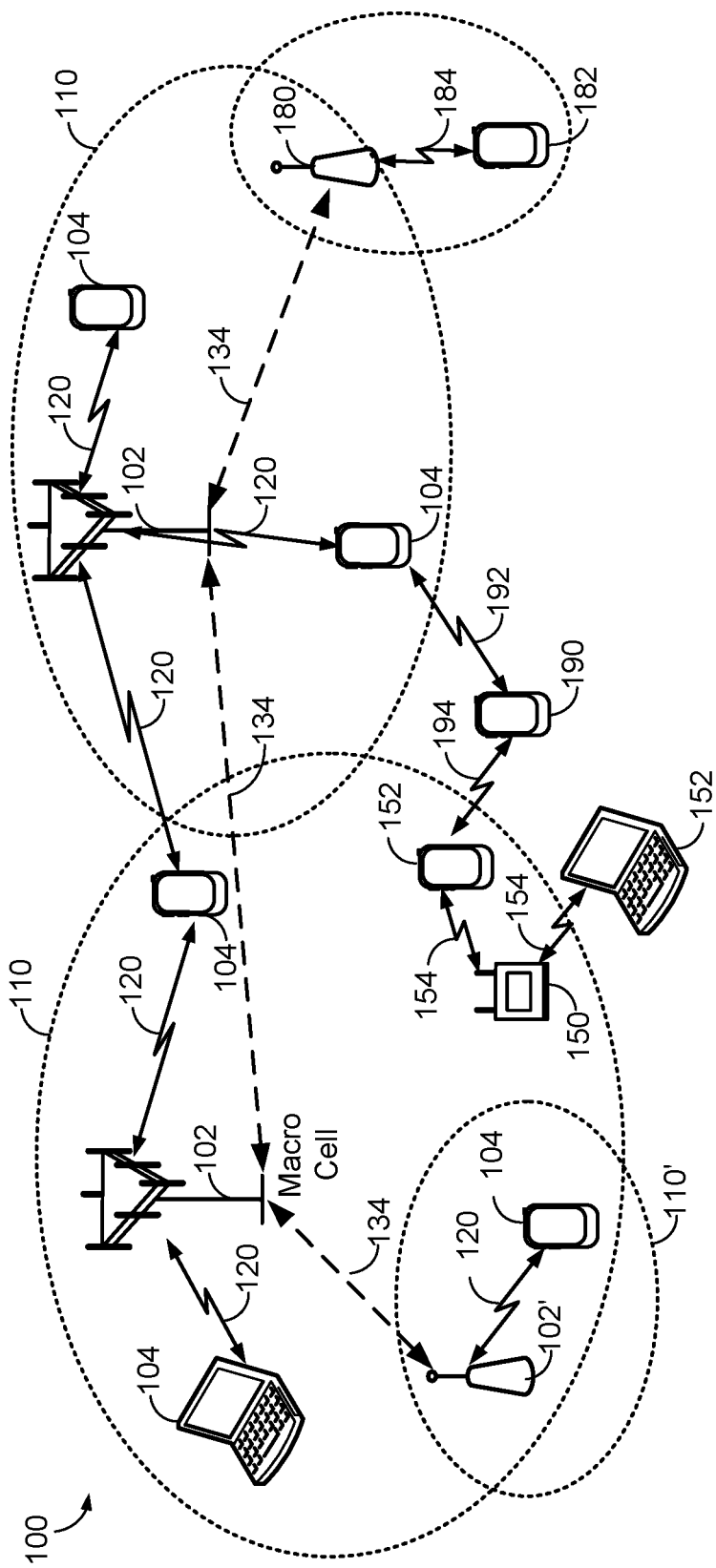
FIG. 1 illustrates an exemplary wireless communications system, according to various aspects.

Aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

As used herein, a user equipment (UE) may be mobile or stationary, and may communicate with a radio access network (RAN) by wireless means. As used herein, the term "UE" may be referred to interchangeably as an "access terminal" or "AT," a "wireless device," a "wireless terminal," a "subscriber device," a "subscriber terminal," a "subscriber station," a "user terminal" or "UT," a "mobile terminal," a "mobile station," a "mobile device," a "client device," and variations thereof. Generally, UEs can communicate with a core network via the RAN (which includes the base stations serving the UE), and through the core network the UEs can be connected with external networks such as the Internet and with external clients via these external networks. Of course, other mechanisms of connecting to the core network and/or the Internet are also possible for the UEs, such as over wired access networks, WiFi networks (e.g., based on the Institute of Electrical and Electronics Engineers (IEEE) 802.11 specification, etc.) and so on. UEs can be embodied by any of a number of types of devices including but not limited to printed circuit (PC) cards, compact flash devices, external or internal modems, wireless or wireline phones, and so on. A communication link through which UEs can send signals to the RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel.

In the following, various aspects of a wireless access network will be described with reference to a multiple-input multiple output (MIMO) system supporting orthogonal frequency-division multiplexing (OFDM) on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations), wherein the macro cell base station may include evolved NodeBs (eNBs), where the wireless communications system 100 corresponds to an LTE network, or gNodeBs (gNBs), where the wireless communications system 100 corresponds to a 5G network or a combination of both, and the small cell base stations may include femtocells, picocells, microcells, etc.

The base stations 102 may collectively form a radio access network (RAN) and interface with an evolved packet core (EPC) or next generation core (NGC) through backhaul links. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, although not shown in FIG. 1, geographic coverage areas 110 may be subdivided into a plurality of cells (e.g., three), or sectors. As used herein, the term "cell" or "sector" may correspond to one of a plurality of cells of a base station 102, or to the base station 102 itself, depending on the context.

While neighboring macro cell base station geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include Home eNBs (HeNBs), which may provide service to a restricted group known as a closed subscriber group (CSG). The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) prior to communicating in order to determine whether the channel is available.

The small cell base station 102' may operate in a licensed and/or an unlicensed frequency spectrum. When operating in an unlicensed frequency spectrum, the small cell base station 102' may employ LTE or 5G technology and use the same 5 GHz unlicensed frequency spectrum as used by the WLAN AP 150. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a mmW base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 may utilize beamforming 184 with the UE 182 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In 5G, the frequency spectrum in which wireless nodes (e.g., base stations, UEs) operate is divided into multiple spectrum ranges, FR1 (from 450 to 6000 MHz), FR2 (from 24250 to 52600 MHz), FR3 (above 52600 MHz), and FR4 (between FR1 and FR2). Thus, for example, base stations 102 and WLAN AP 150 may operate in FR1, while mmW base station 180 may operate in FR2.

The wireless communications system 100 may further include one or more UEs, such as UE 190, that connects indirectly to one or more communication networks via one or more device-to-device (D2D) peer-to-peer (P2P) links. In the embodiment of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192-194 may be supported with any well-known D2D radio access technology (RAT), such as LTE Direct (LTE-D), WiFi Direct (WiFi-D), Bluetooth®, and so on.

Figure 2A:
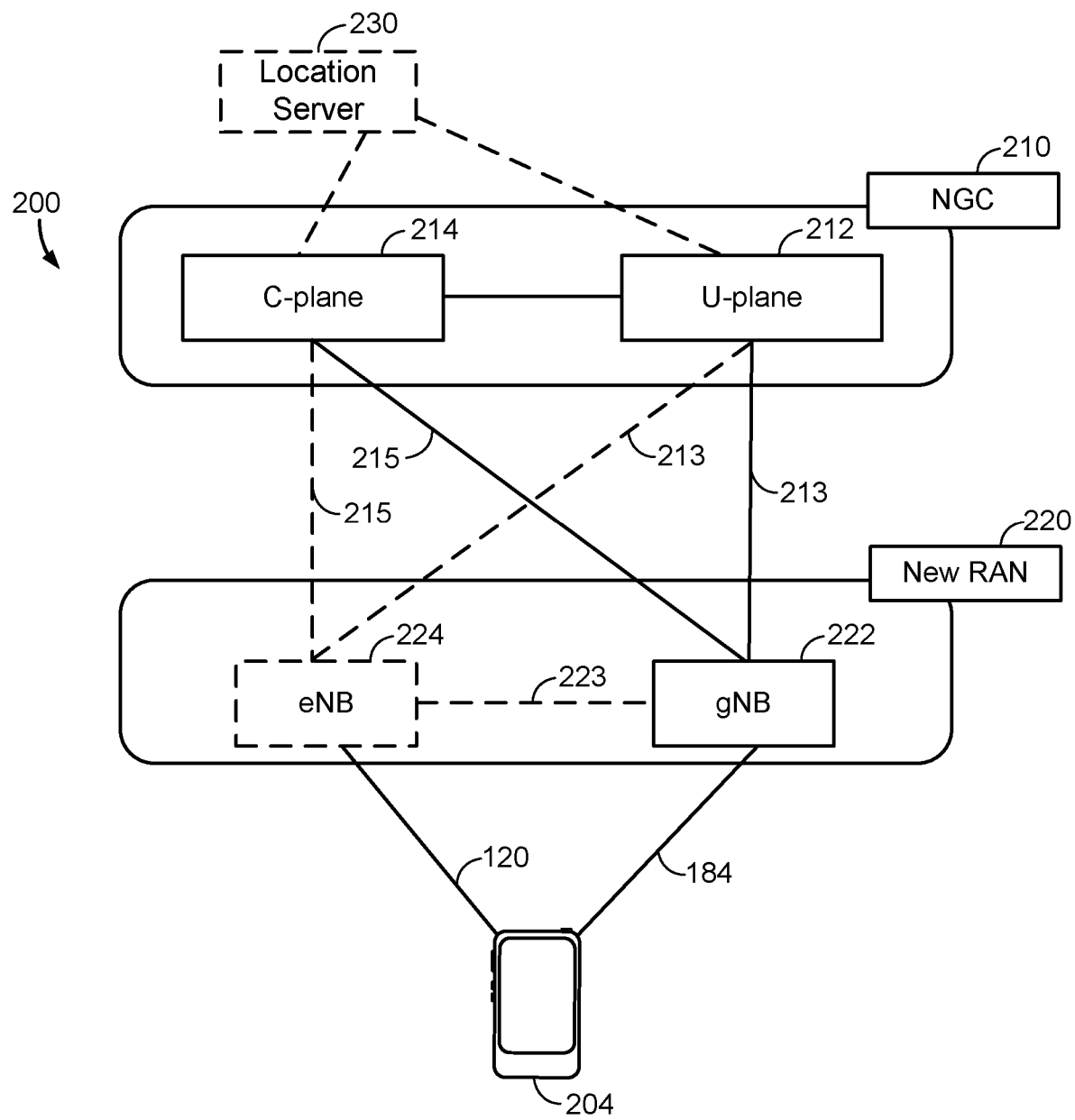
FIGS. 2A and 2B illustrate example wireless network structures, according to various aspects.

According to various aspects, FIG. 2A illustrates an example wireless network structure 200. For example, an NGC 210 can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the NGC 210 and specifically to the control plane functions 214 and user plane functions 212. In an additional configuration, an eNB 224 may also be connected to the NGC 210 via NG-C 215 to the control plane functions 214 and NG-U 213 to user plane functions 212. Further, eNB 224 may directly communicate with gNB 222 via a backhaul connection 223. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include location server 230, which may be in communication with the NGC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, NGC 210, and/or via the Internet (not illustrated). Further, the location server 230 may be integrated into a component of the core network, or alternatively may be external to the core network.

Figure 2B:
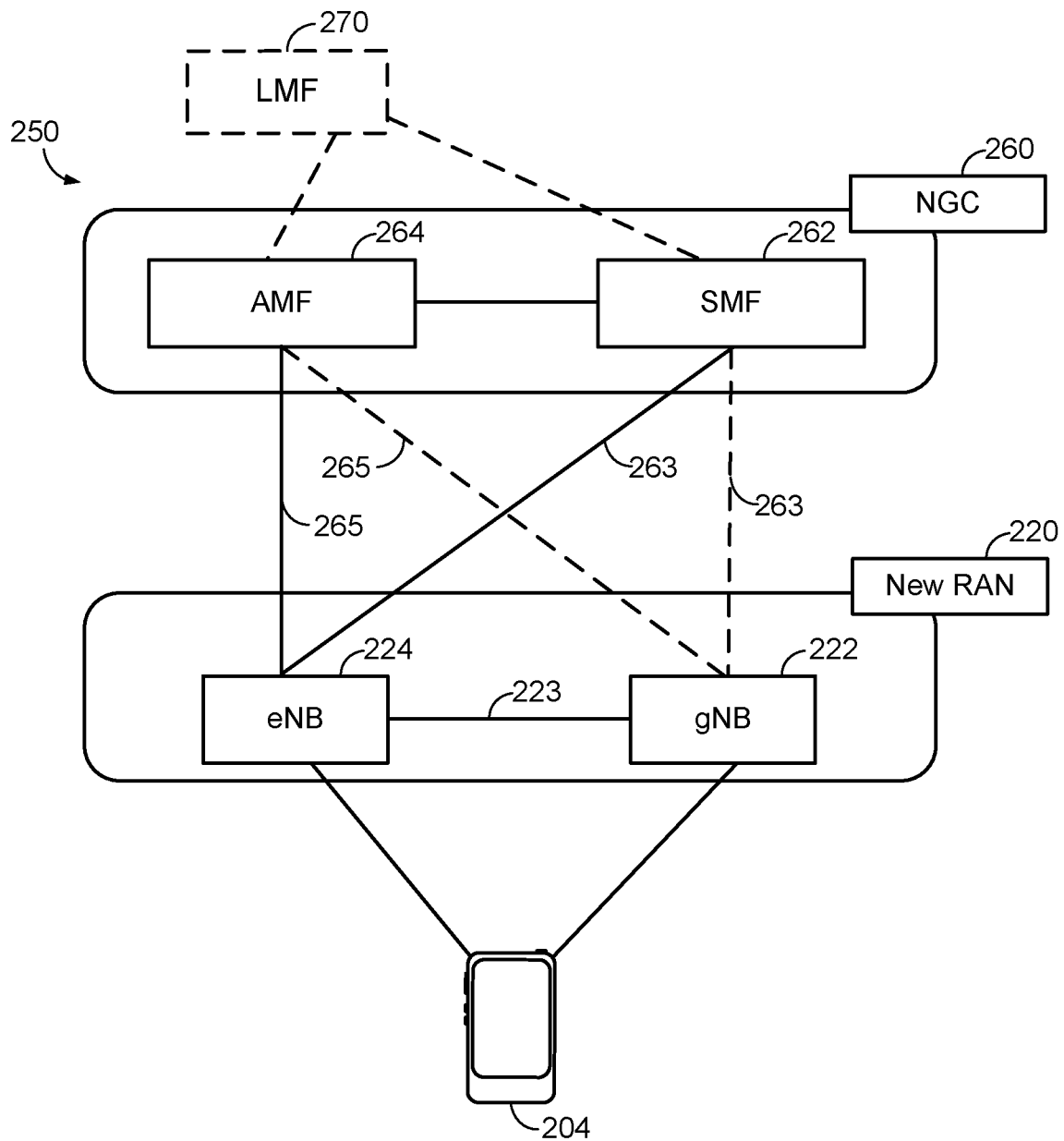

According to various aspects, FIG. 2B illustrates another example wireless network structure 250. For example, an NGC 260 can be viewed functionally as control plane functions, an access and mobility management function (AMF) 264 and user plane functions, and a session management function (SMF) 262, which operate cooperatively to form the core network. User plane interface 263 and control plane interface 265 connect the eNB 224 to the NGC 260 and specifically to AMF 264 and SMF 262. In an additional configuration, a gNB 222 may also be connected to the NGC 260 via control plane interface 265 to AMF 264 and user plane interface 263 to SMF 262. Further, eNB 224 may directly communicate with gNB 222 via the backhaul connection 223, with or without gNB direct connectivity to the NGC 260. Accordingly, in some configurations, the New RAN 220 may only have one or more gNBs 222, while other configurations include one or more of both eNBs 224 and gNBs 222. Either gNB 222 or eNB 224 may communicate with UEs 204 (e.g., any of the UEs depicted in FIG. 1, such as UEs 104, UE 182, UE 190, etc.). Another optional aspect may include a location management function (LMF) 270, which may be in communication with the NGC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, NGC 260, and/or via the Internet (not illustrated).

Figure 3:
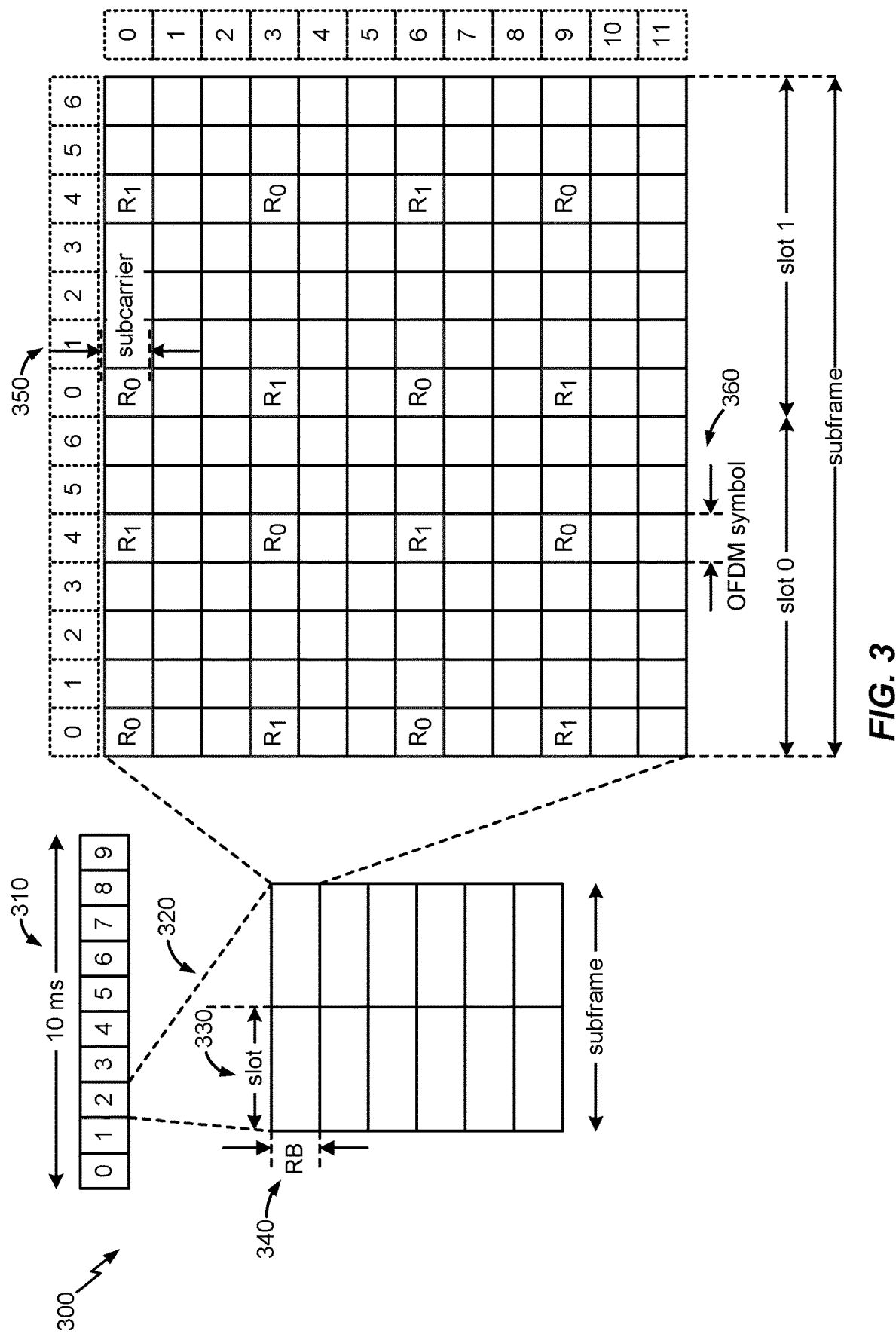
FIG. 3 is a diagram illustrating an example of a frame structure for use in a wireless telecommunications system according to an aspect of the disclosure.

Various frame structures may be used to support downlink and uplink transmissions. FIG. 3 illustrates an example of a downlink frame structure 300 according to aspects of the disclosure. However, as those skilled in the art will readily appreciate, the frame structure for any particular application may be different depending on any number of factors. In this example, a frame 310 (10 ms) is divided into 10 equally sized subframes 320 (1 ms). Each subframe 320 includes two consecutive time slots 330 (0.5 ms).

A resource grid may be used to represent two time slots 330, each time slot 330 including a resource block (RB) 340. The resource grid is divided into multiple resource elements (REs). In LTE, a resource block contains 12 consecutive subcarriers 350 in the frequency domain and, for a normal cyclic prefix (CP) in each OFDM symbol, 7 consecutive OFDM symbols 360 in the time domain, or 84 resource elements. Some of the resource elements, as indicated as $R_0$ and $R_1$, include a downlink reference signal (DL-RS). The DL-RS may include cell-specific RS (CRS) (also sometimes called common RS) and UE-specific RS (UE-RS). UE-RS are transmitted only on the resource blocks 340 upon which the corresponding physical downlink shared channel (PDSCH) is mapped. The number of bits carried by each resource element depends on the modulation scheme. Thus, the more resource blocks 340 that a UE receives and the higher the modulation scheme, the higher the data rate for the UE.

LTE, and in some cases 5G NR, utilize OFDM on the downlink and single-carrier frequency division multiplexing (SC-FDM) on the uplink. Unlike LTE, however, 5G NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

Figure 4A:
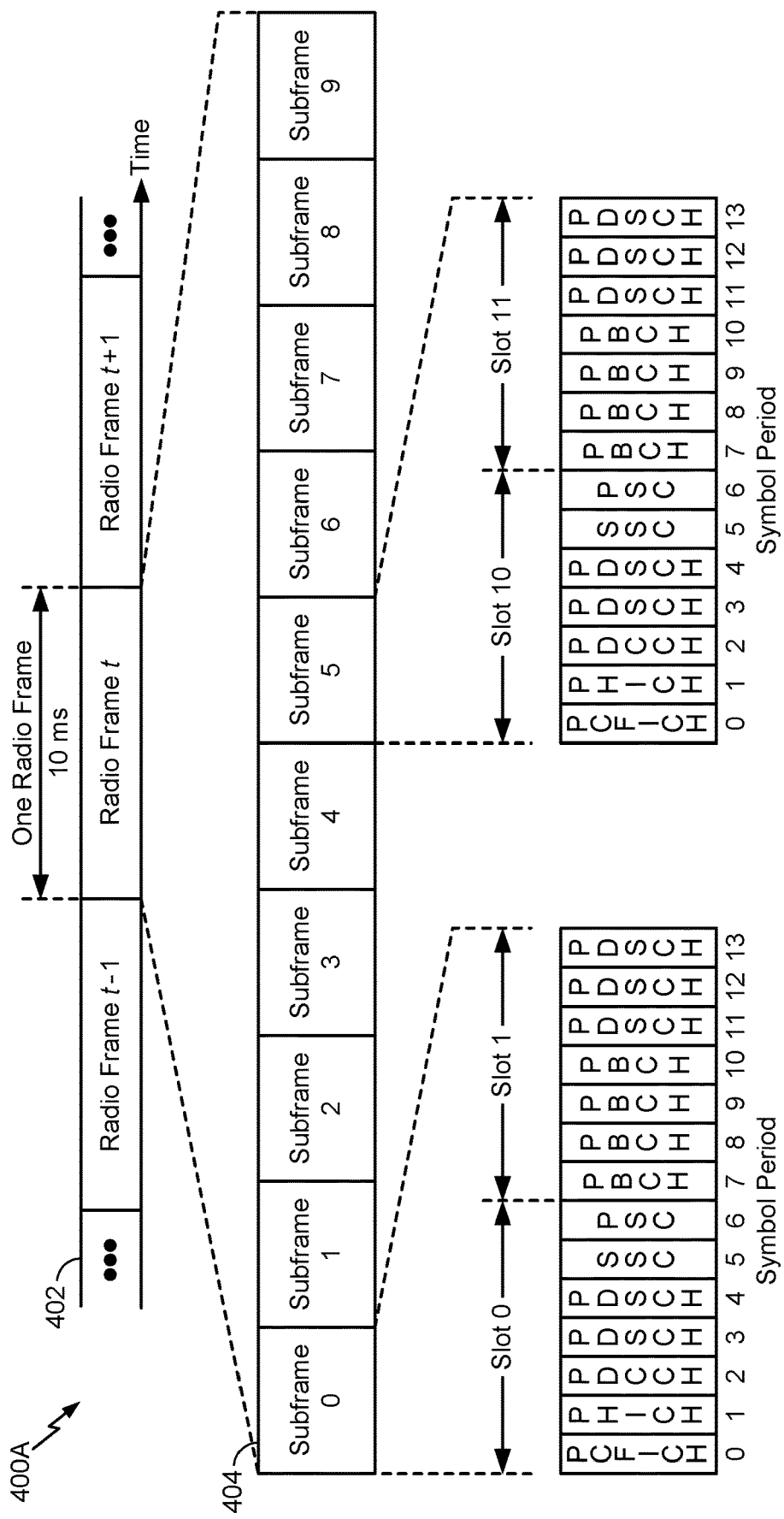
FIG. 4A is a diagram illustrating an example of a downlink frame structure in a wireless telecommunications system according to an aspect of the disclosure.

FIG. 4A shows a downlink frame structure 400A used in LTE, and which may also be used in 5G NR, according to aspects of the disclosure. The transmission timeline for the downlink may be partitioned into units of radio frames 402 (which may correspond to frame 310 in FIG. 3). Each radio frame 402 may have a predetermined duration (e.g., 10 ms) and may be partitioned into 10 subframes 404 (which may correspond to subframes 320 in FIG. 3) with indices of 0 through 9. Each subframe 404 may include two slots (which may correspond to time slots 330 in FIG. 3). Each radio frame 402 may thus include 20 slots with indices of 0 through 19. Each slot may include L symbol periods, e.g., 7 symbol periods for a normal cyclic prefix (as shown in FIG. 4A) or 14 symbol periods for an extended cyclic prefix. The 2L symbol periods in each subframe 404 may be assigned indices of 0 through 2L−1. The available time frequency resources may be partitioned into resource blocks. Each resource block may cover N subcarriers (e.g., 12 subcarriers) in one slot.

A base station (referred to as an "eNodeB" or "eNB" in LTE and a "gNodeB" or "gNB" in 5G NR) may send a primary synchronization signal (PSS) and a secondary synchronization signal (SSS) for each cell of the base station. The primary and secondary synchronization signals may be sent in symbol periods 6 and 5, respectively, in each of subframes 0 and 5 of each radio frame with the normal cyclic prefix, as shown in FIG. 4A. The synchronization signals may be used by UEs for cell detection and acquisition. The base station may send a physical broadcast channel (PBCH) in symbol periods 0 to 3 in slot 1 of subframe 0. The PBCH may carry certain system information.

The base station may send a physical control format indicator channel (PCFICH) in only a portion of the first symbol period of each subframe 404, although depicted in the entire first symbol period in FIG. 4A. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. In the example shown in FIG. 4A, M=3. The base station may send a physical HARQ (hybrid automatic retransmission request) indicator channel (PHICH) and a physical downlink control channel (PDCCH) in the first M symbol periods of each subframe (M=3 in FIG. 4A). The PHICH may carry information to support HARQ. The PDCCH may carry information on uplink and downlink resource allocation for UEs and power control information for uplink channels. Although not shown in the first symbol period in FIG. 4A, it is understood that the PDCCH and PHICH are also included in the first symbol period. Similarly, the PHICH and PDCCH are also both in the second and third symbol periods, although not shown that way in FIG. 4A. The base station may send a physical downlink shared channel (PDSCH) in the remaining symbol periods of each subframe 404. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The base station may send the PSS, SSS, and PBCH in the center 1.08 MHz of the system bandwidth used by the base station. The base station may send the PCFICH and PHICH across the entire system bandwidth in each symbol period in which these channels are sent. The base station may send the PDCCH to groups of UEs in certain portions of the system bandwidth. The base station may send the PDSCH to specific UEs in specific portions of the system bandwidth. The base station may send the PSS, SSS, PBCH, PCFICH and PHICH in a broadcast manner to all UEs, may send the PDCCH in a unicast manner to specific UEs, and may also send the PDSCH in a unicast manner to specific UEs.

A single instance of a downlink physical channel (e.g., PDCCH, PDSCH) may be sent over multiple slots (which is permitted for certain channels by certain standards), or multiple instances of the downlink physical channel may be sent over multiple slots (e.g., two different packets on two different PDSCHs, or one packet and its HARQ retransmission).

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 32, or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. A base station may send the PDCCH to the UE in any of the combinations that the UE will search.

Figure 4B:
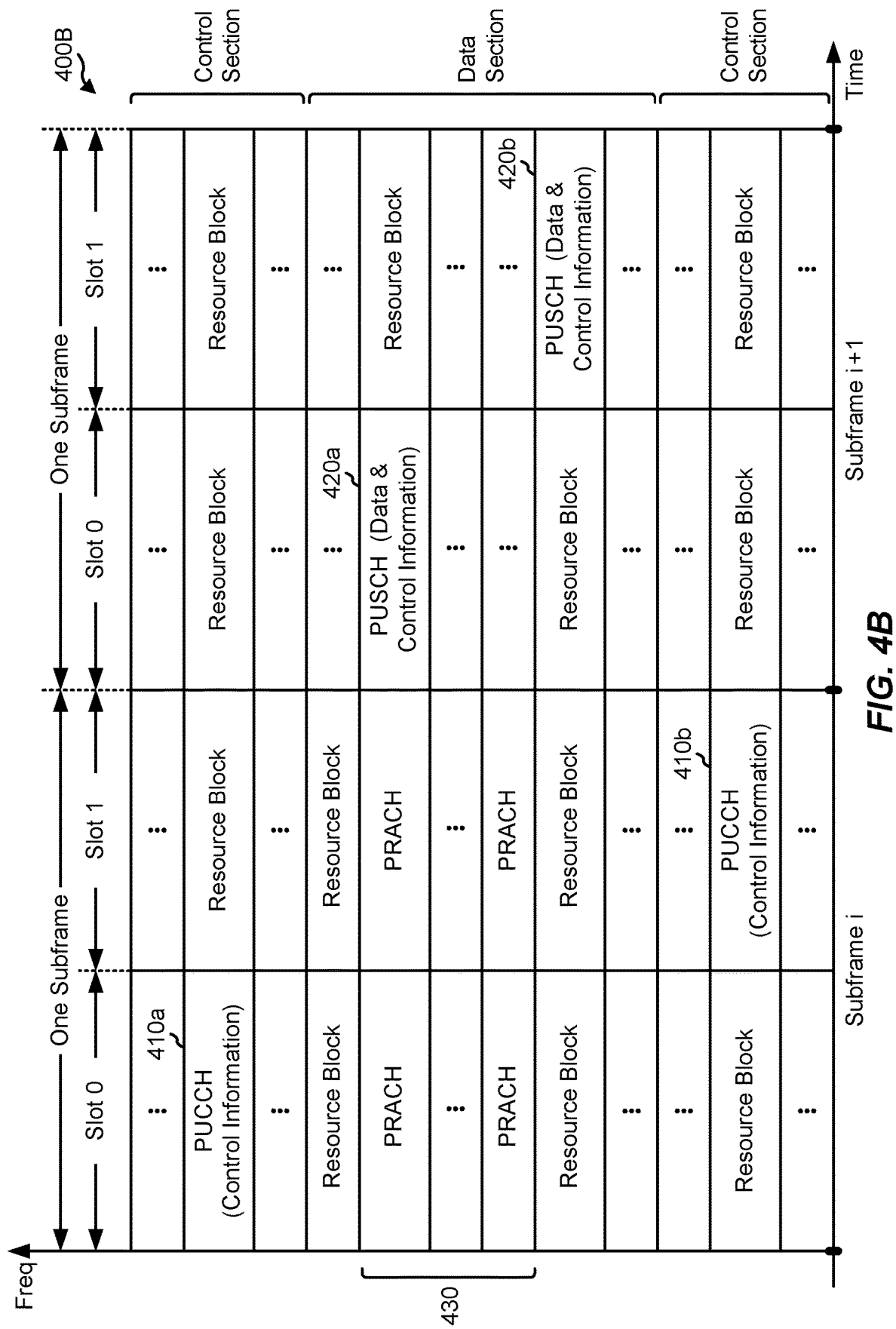
FIG. 4B is a diagram illustrating an example of an uplink frame structure in a wireless telecommunications system according to an aspect of the disclosure.

An example of an uplink frame structure 400B will now be presented with reference to FIG. 4B. FIG. 4B shows an exemplary format for the uplink in LTE, according to various aspects of the disclosure, which may also be used in 5G NR. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 4B results in the data section including contiguous subcarriers, which may allow a single UE to be assigned all of the contiguous subcarriers in the data section.

A UE may be assigned resource blocks 410a, 410b in the control section to transmit control information to a base station (e.g., an eNodeB in LTE, a gNodeB in 5G NR). The UE may also be assigned resource blocks 420a, 420b in the data section to transmit data to the base station. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency as shown in FIG. 4B.

As shown in FIG. 4B, a set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (e.g., 1 ms), and a UE can make only a single PRACH attempt per frame (e.g., 10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 5:
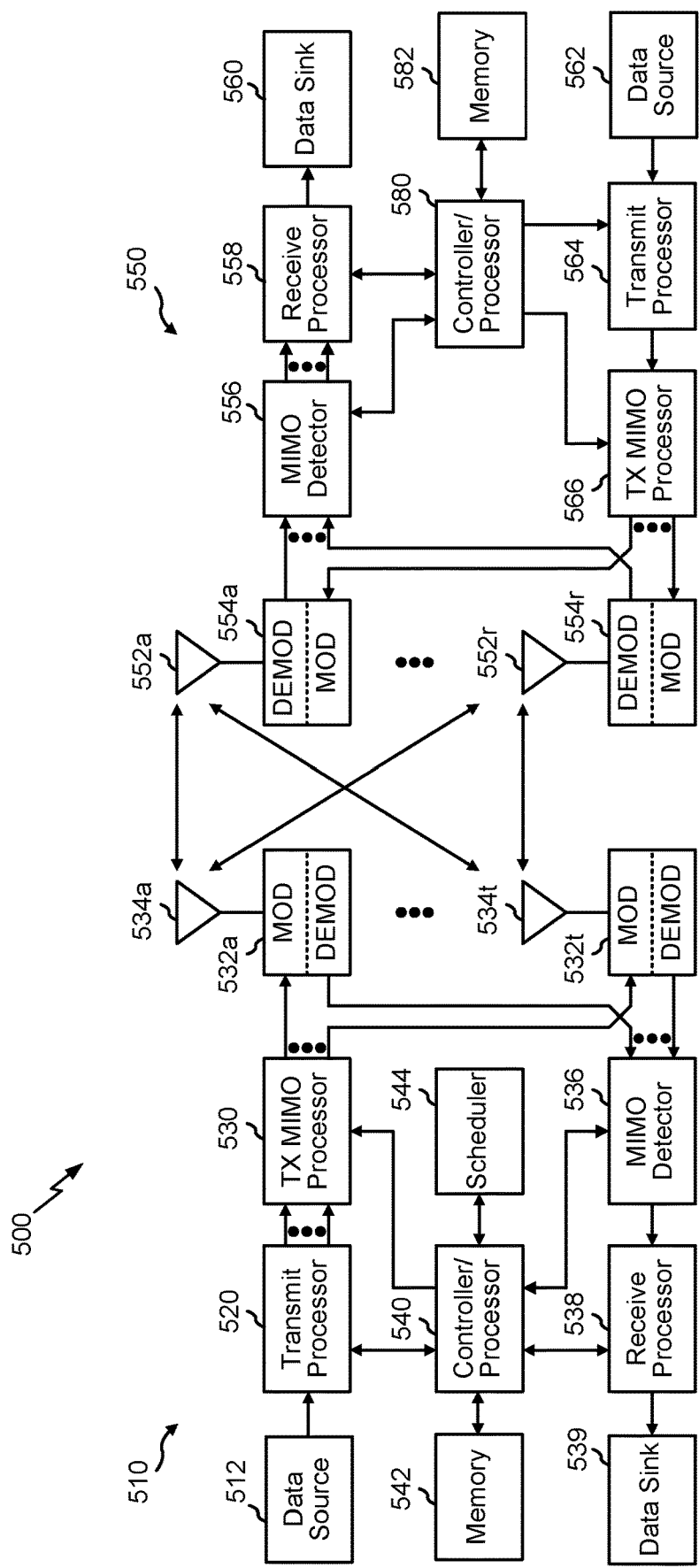
FIG. 5 illustrates an exemplary base station and an exemplary UE in a wireless telecommunications system, according to various aspects.

FIG. 5 is a block diagram 500 of a design of a base station 510 (which may correspond to any of the base stations described above) and a UE 550 (which may correspond to any of the UEs described above) that may communicate over the physical uplink and downlink channels described above, according to aspects of the disclosure. At the base station 510, a transmit processor 520 may receive data from a data source 512 and control information from a controller/processor 540. The control information may be for the PBCH, PCFICH, PHICH, PDCCH, etc. The data may be for the PDSCH, etc. The processor 520 may process (e.g., encode and symbol map) the data and control information to obtain data symbols and control symbols, respectively. The processor 520 may also generate reference symbols, e.g., for the PSS, SSS, and CRS. A transmit (TX) MIMO processor 530 may perform spatial processing (e.g., precoding) on the data symbols, the control symbols, and/or the reference symbols, if applicable, and may provide output symbol streams to the modulators (MODs) 532a through 532t. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink signal. Downlink signals from modulators 532a through 532t may be transmitted via the antennas 534a through 534t, respectively.

At the UE 550, the antennas 552a through 552r may receive the downlink signals from the base station 510 and may provide received signals to the demodulators (DEMODs) 554a through 554r, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554a through 554r, perform MIMO detection on the received symbols if applicable, and provide detected symbols. A receive processor 558 may process (e.g., demodulate, deinterleave, and decode) the detected symbols, provide decoded data for the UE 550 to a data sink 560, and provide decoded control information to a controller/processor 580.

On the uplink, at the UE 550, a transmit processor 564 may receive and process data (e.g., for the PUSCH) from a data source 562 and control information (e.g., for the PUCCH) from the controller/processor 580. The transmit processor 564 may also generate reference symbols for a reference signal. The symbols from the transmit processor 564 may be precoded by a TX MIMO processor 566 if applicable, further processed by the demodulators 554a through 554r (e.g., for SC-FDM, etc.), and transmitted to the base station 510. At the base station 510, the uplink signals from the UE 550 may be received by the antennas 534, processed by the modulators 532, detected by a MIMO detector 536 if applicable, and further processed by a receive processor 538 to obtain decoded data and control information sent by the UE 550. The receive processor 538 may provide the decoded data to a data sink 539 and the decoded control information to the controller/processor 540.

The controllers/processors 540 and 580 may direct the operation at the base station 510 and the UE 550, respectively. The processor 540 and/or other processors and modules at the base station 510 may perform or direct the execution of various processes for the techniques described herein. The processor 580 and/or other processors and modules at the UE 550 may also perform or direct the execution of the techniques described herein. The memories 542 and 582 may store data and program codes for the base station 510 and the UE 550, respectively. A scheduler 544 may schedule UEs for data transmission on the downlink and/or uplink.

In cellular networks, base stations periodically transmit positioning measurement signals, such as positioning reference signals (PRS) in LTE or navigation reference signals (NRS) in 5G NR, to facilitate the determination of position estimates of UEs in their coverage area. The UEs or another network node (e.g., a base station, location server, etc.) may determine the position estimate based on measurements of positioning measurement signals made by the UEs. Note that as used herein, the terms "positioning measurement signal" and "PRS" may be used interchangeably to refer to any positioning measurement signal, not only an LTE PRS, unless the context indicates otherwise.

The term "position estimate" is used herein to refer to an estimate of a position or location of a UE, which may be geographic (e.g., may comprise a latitude, longitude, and possibly altitude) or civic (e.g., may comprise a street address, building designation, or precise point or area within or nearby to a building or street address, such as a particular entrance to a building, a particular room or suite in a building, or a landmark such as a town square). A position estimate may also be referred to as a "location," a "position," a "fix," a "position fix," a "location fix," a "position estimate," a "fix estimate," or the like. The means of obtaining a position estimate may be referred to generically as "positioning," "locating," "position fixing," or the like. A particular solution for obtaining a position estimate may be referred to as a "position solution" or the like. A particular method for obtaining a position estimate as part of a position solution may be referred to as a "position method," a "positioning method," or the like.

In LTE, and in some cases in 5G NR, PRS are transmitted in a configurable number of subframes, which could be one, two, four, or six consecutive subframes out of every 160, 320, 640, or 1280 subframes (e.g., 1 ms). The base station configures the PRS bandwidth (e.g., a certain number of resource blocks) and the periodicity of the PRS (e.g., one PRS subframe every 160 subframes). Within a subframe containing PRS, PRS are transmitted on more subcarriers and more OFDM symbols compared to the regular cell-specific reference signals (e.g., PBCH, PSS, and SSS) being sent on an antenna. PRS utilizes more time-frequency resources within a subframe to improve the quality of the UE measurements compared to the use of only the basic cell-specific reference signals. Further, the network may coordinate transmissions by different base stations so as to reduce the interference between their PRS transmissions as seen by the receiving UEs; for example, by transmitting PRS from a base station while muting all transmissions in the same time-frequency resources from its neighboring base stations.

A PRS carries a pseudo-random sequence, which is a function of various factors such as physical layer cell identity (PCI), slot number, OFDM symbol number, and the value of the cyclic prefix. The UE detects the PRS from different cells (which may belong to the same base station or to different base stations) in the "neighborhood" (i.e., within communication range) of the UE and makes certain measurements of those PRS. Such measurements may include observed time difference of arrival (OTDOA) measurements, such as reference signal time difference (RSTD) measurements. RSTD is the relative timing difference between the PRS received from a neighbor cell and a reference cell. The UE typically sends these measurements to the serving base station, which processes them in an implementation-specific and non-standardized manner to estimate the position of the UE.

Figure 6:
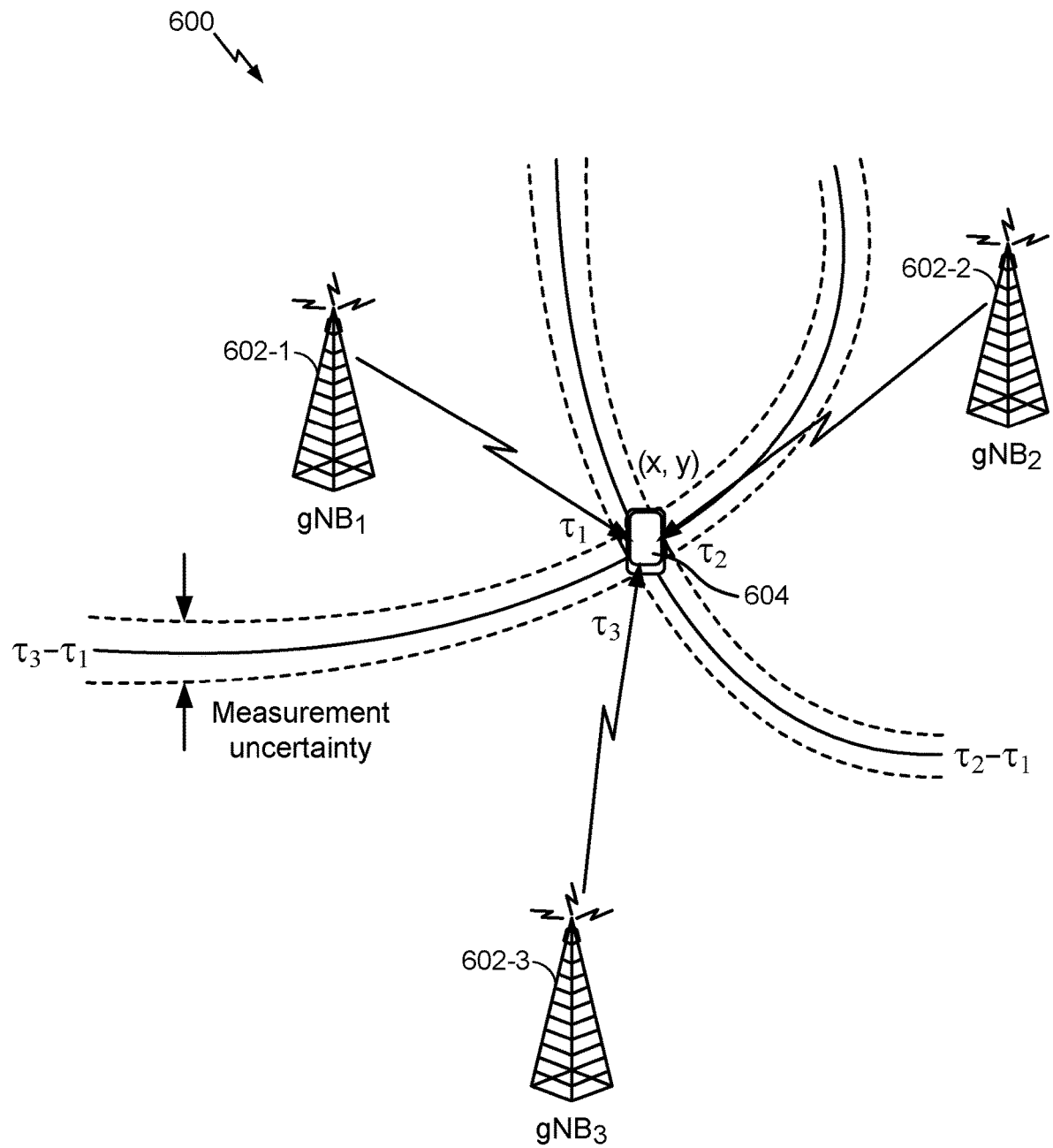
FIG. 6 is a diagram illustrating an exemplary technique for determining a position of a mobile device using information obtained from a plurality of base stations.

FIG. 6 illustrates an exemplary wireless communications system 600 according to various aspects of the disclosure. In the example of FIG. 6, a UE 604, which may correspond to any of the UEs described above, is attempting to calculate an estimate of its position, or assist another entity (e.g., a base station or core network component, another UE, a location server, a third party application, etc.) to calculate an estimate of its position. The UE 604 may communicate wirelessly with a plurality of base stations 602-1, 602-2, and 602-3 (collectively, base stations 602), which may correspond to any combination of the base stations described above, using radio frequency (RF) signals and standardized protocols for the modulation of the RF signals and the exchange of information packets. By extracting different types of information from the exchanged RF signals, and utilizing the layout of the wireless communications system 600 (e.g., the base stations locations, geometry, etc.), the UE 604 may determine its position, or assist in the determination of its position, in a predefined reference coordinate system. In an aspect, the UE 604 may specify its position using a two-dimensional (2D) coordinate system; however, the aspects disclosed herein are not so limited, and may also be applicable to determining positions using a three-dimensional (3D) coordinate system, if the extra dimension is desired. Additionally, while FIG. 6 illustrates one UE 604 and three base stations 602, as will be appreciated, there may be more UEs 604 and more base stations 602.

To support position estimates, the base stations 602 may be configured to broadcast reference signals (e.g., PRS, NRS, transmitter reference signals (TRS), etc.) to UEs 604 in their coverage area to enable a UE 604 to measure characteristics of such reference signals. For example, the OTDOA positioning method, defined by the 3rd Generation Partnership Project (3GPP) (e.g., in 3GPP TS 36.355, which is publicly available) for wireless networks that provide wireless access using 5G NR, is a multilateration method in which the UE 604 measures the time difference, known as an RSTD, between specific reference signals (e.g., PRS, CRS, TRS, etc.) transmitted by different pairs of network nodes (e.g., base stations 602, antennas of base stations 602, etc.) and either reports these time differences to a location server, such as the location server 230 or LMF 270, or computes a location estimate itself from these time differences.

Generally, RSTDs are measured between a reference network node (e.g., base station 602-1 in the example of FIG. 6) and one or more neighbor network nodes (e.g., base stations 602-2 and 602-3 in the example of FIG. 6). The reference network node remains the same for all RSTDs measured by the UE 604 for any single positioning use of OTDOA and would typically correspond to the serving cell for the UE 604 or another nearby cell with good signal strength at the UE 604. In an aspect, where a measured network node is a cell supported by a base station, the neighbor network nodes would normally be cells supported by base stations different from the base station for the reference cell and may have good or poor signal strength at the UE 604. The location computation can be based on the measured time differences (e.g., RSTDs) and knowledge of the network nodes' locations and relative transmission timing (e.g., regarding whether network nodes are accurately synchronized or whether each network node transmits with some known time difference relative to other network nodes).

To assist positioning operations, a location server (e.g., location server 230, LMF 270) may provide OTDOA assistance data to the UE 604 for the reference network node (e.g., base station 602-1 in the example of FIG. 6) and the neighbor network nodes (e.g., base stations 602-2 and 602-3 in the example of FIG. 6) relative to the reference network node. For example, the assistance data may provide the center channel frequency of each network node, various reference signal configuration parameters (e.g., the number of consecutive positioning subframes, periodicity of positioning subframes, muting sequence, frequency hopping sequence, reference signal identifier (ID), reference signal bandwidth), a network node global ID, and/or other cell related parameters applicable to OTDOA. The OTDOA assistance data may indicate the serving cell for the UE 604 as the reference network node.

In some cases, OTDOA assistance data may also include "expected RSTD" parameters, which provide the UE 604 with information about the RSTD values the UE 604 is expected to measure at its current location between the reference network node and each neighbor network node, together with an uncertainty of the expected RSTD parameter. The expected RSTD, together with the associated uncertainty, may define a search window for the UE 604 within which the UE 604 is expected to measure the RSTD value. OTDOA assistance information may also include reference signal configuration information parameters, which allow a UE 604 to determine when a reference signal positioning occasion occurs on signals received from various neighbor network nodes relative to reference signal positioning occasions for the reference network node, and to determine the reference signal sequence transmitted from various network nodes in order to measure a signal time of arrival (ToA) or RSTD.

In an aspect, while the location server (e.g., location server 230, LMF 270) may send the assistance data to the UE 604, alternatively, the assistance data can originate directly from the network nodes (e.g., base stations 602) themselves (e.g., in periodically broadcasted overhead messages, etc.). Alternatively, the UE 604 can detect neighbor network nodes itself without the use of assistance data.

The UE 604 (e.g., based in part on the assistance data, if provided) can measure and (optionally) report the RSTDs between reference signals received from pairs of network nodes. Using the RSTD measurements, the known absolute or relative transmission timing of each network node, and the known position(s) of the transmitting antennas for the reference and neighboring network nodes, the network (e.g., location server 230/LMF 270, a base station 602) or the UE 604 may estimate a position of the UE 604. More particularly, the RSTD for a neighbor network node "k" relative to a reference network node "Ref" may be given as (ToA$_k$−ToA$_{Ref}$), where the ToA values may be measured modulo one subframe duration (1 ms) to remove the effects of measuring different subframes at different times. In the example of FIG. 6, the measured time differences between the reference cell of base station 602-1 and the cells of neighboring base stations 602-2 and 602-3 are represented as $\tau_2-\tau_1$ and $\tau_3-\tau_1$, where $\tau_1$, $\tau_2$, and $\tau_3$ represent the ToA of a reference signal from the transmitting antenna(s) of base station 602-1, 602-2, and 602-3, respectively. The UE 604 may then convert the ToA measurements for different network nodes to RSTD measurements (e.g., as defined in 3GPP TS 36.214 entitled "Physical layer; Measurements," which is publicly available) and (optionally) send them to the location server 230/LMF 270. Using (i) the RSTD measurements, (ii) the known absolute or relative transmission timing of each network node, (iii) the known position(s) of physical transmitting antennas for the reference and neighboring network nodes, and/or (iv) directional reference signal characteristics such as a direction of transmission, the UE's 604 position may be determined (either by the UE 604 or the location server 230/LMF 270).

Still referring to FIG. 6, when the UE 604 obtains a location estimate using OTDOA measured time differences, the necessary additional data (e.g., the network nodes' locations and relative transmission timing) may be provided to the UE 604 by a location server (e.g., location server 230, LMF 270). In some implementations, a location estimate for the UE 604 may be obtained (e.g., by the UE 604 itself or by the location server 230/LMF 270) from OTDOA measured time differences and from other measurements made by the UE 604 (e.g., measurements of signal timing from global positioning system (GPS) or other global navigation satellite system (GNSS) satellites). In these implementations, known as hybrid positioning, the OTDOA measurements may contribute towards obtaining the UE's 604 location estimate but may not wholly determine the location estimate.

Uplink time difference of arrival (UTDOA) is a similar positioning method to OTDOA, but is based on uplink reference signals (e.g., sounding reference signals (SRS), uplink positioning reference signals (UL PRS)) transmitted by the UE (e.g., UE 604). Further, transmission and/or reception beamforming at the base station 602 and/or UE 604 can enable wideband bandwidth at the cell edge for increased precision. Beam refinements may also leverage channel reciprocity procedures in 5G NR.

Certain network nodes (whether a base station or a UE), especially those capable of 5G NR communication, may use beamforming to send and receive information over a wireless channel. Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In 5G NR, there are four types of quasi-collocation (QCL) relations. Specifically, a QCL relation of a given type means that certain parameters about a second reference signal on a second beam can be derived from information about a source reference signal on a source beam. Thus, if the source reference signal is QCL Type A, the receiver can use the source reference signal to estimate the Doppler shift, Doppler spread, average delay, and/or delay spread of a second reference signal transmitted on the same channel. If the source reference signal is QCL Type B, the receiver can use the source reference signal to estimate the Doppler shift and Doppler spread of a second reference signal transmitted on the same channel. If the source reference signal is QCL Type C, the receiver can use the source reference signal to estimate the Doppler shift and average delay of a second reference signal transmitted on the same channel. If the source reference signal is QCL Type D, the receiver can use the source reference signal to estimate the spatial receive parameter of a second reference signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

As noted briefly above, 5G NR is being developed to provide higher data transfer speeds, greater numbers of connections, and better coverage, among other improvements. Consequently, the spectral efficiency, signaling efficiency, and latency of 5G NR mobile communications should be significantly enhanced compared to the current standards.

One optimization that can be made in 5G NR is to minimize PRS overhead by reusing existing physical channels (e.g., PDCCH, PDSCH, PUCCH, PUSCH, PRACH) for positioning measurement signals, as various physical signals, such as the synchronization signal block (SSB) and channel state information reference signal (CSI-RS) on the downlink and the SRS on the uplink, can be re-purposed as positioning measurement signals.

For uplink PRS transmissions from the UE to the base station, the use of uplink channels as positioning measurement signals is based on the base station/network implementation. Thus, like UTDOA in LTE, the UE does not have to be aware of it, and the base station may specify any of the PUCCH, PUSCH, and PRACH. That is, the UE does not need to know that the base station is using the selected channel as an uplink physical channel. This aspect may include the base station asking the UE to transmit the selected uplink physical channel with the specific purpose of positioning, for example, PDCCH-ordered PRACH. In this case, changes to the standards for communication among network elements could involve specifying exactly which uplink signal or signals from the UE were used by the base station to compute a given positioning related measurement (for example, a TOA). This may be beneficial given the greater flexibility in configuration of uplink signals in 5G NR relative to in LTE (for example, variable durations within a slot for PUSCH and PUCCH). In this context, communication between network elements could, for example, include communication between base stations (gNodeBs in 5G NR) on the Xn interface, or between the base stations and the access management function (e.g., AMF 264), or between the base station and the location server (e.g., location server 230).

For downlink physical channels, such as PDCCH and PDSCH, because they are currently used to transmit data and control information to the UE, their use as PRS should be on a best-effort basis. Using a downlink physical channel as a PRS (referred to herein as a "PRS downlink physical channel") would not require any structural changes to the waveform, encoding, etc. of the channel to enable it to be used as a PRS. Any desired changes in the parameters of the downlink physical channel, such as PRS comb density, can be achieved in CSI-RS based PRS. Note that as used herein, the term "PRS" may include downlink physical channels used as PRS/positioning measurement signals.

In order to use a downlink physical channel as a PRS, the UE can use the demodulation reference signal (DMRS) of the downlink physical channel. The UE may optionally use data modulation symbols in the channel. For example, the UE may use the data after decoding/re-encoding/modulating. This may be used only on successful decoding (e.g., a cyclic redundancy check (CRC) "pass"). As another example, the UE may use "hard-slicing" on data modulation symbols before decoding, that is, determining the transmitted data modulation symbols based on the noisy received data modulation symbols without first decoding the information bits in the data packet that was encoded and modulated to create those data modulation symbols. Similarly, if the physical channel transmission includes other reference signals, such as phase-tracking reference signals (PTRS), then those may be optionally used for positioning as well. The ability of the UE to use these transmissions for positioning, as well as the scheme that the UE uses (i.e., which sets of modulation symbols—DMRS, PTRS, or data—are used, and whether PDCCH, PDSCH, or both are used) may be a UE capability.

In order for the UE to use downlink physical channels as PRS, the UE needs an advance indication of which downlink physical channel(s) to use as PRS. The reason an indication may be needed in advance is that PRS processing may include steps not needed for regular processing, such as time-domain channel estimation/noise-tap-cleaning, first arriving path determination, angle of arrival (AoA)/angle of departure (AoD) estimation, and the like. It may also include re-encoding/re-modulating if post-decoding data modulation-symbols are used.

In some cases, it may be preferable for the base station to provide fewer (less frequent) indications to the UE. In that case, as an example, the base station can use radio resource control (RRC), a medium access control-control element (MAC-CE), and/or downlink control information (DCI) to activate or deactivate the mode in which certain downlink physical channels (such as PDSCH or PDCCH) are treated as PRS. In an aspect, the base station can restrict PRS downlink physical channels to certain slots (e.g., to even-indexed slots, slots within a repeating time window, etc.) to limit UE complexity. In an aspect, the base station can restrict PRS downlink physical channels to certain beams or QCL types, for example, to only the instances of transmission of the PDSCH that are QCL'ed with respect to the spatial receive beam (which may be referred to simply as "spatial Rx QCLed") with a specific SSB index. Specifying that two signals are spatially Rx QCLed means that the UE is allowed to use the same receive beamforming or spatial filter to receive those two signals. In particular, a base station may signal two transmissions to be spatially Rx QCLed if it uses the same transmit analog beamforming to transmit them. More generally, if two antenna ports are quasi co-located, the UE may assume that large-scale properties of the channel over which a symbol on one antenna port is conveyed can be inferred from the channel over which a symbol on the other antenna port is conveyed. For example, the large-scale properties may include delay spread, Doppler spread, Doppler shift, average gain, average delay, and spatial Rx parameters.

In some cases, it may be preferable for the base station to provide more frequent indications to the UE. In that case, as an example, the DCI scheduling for a downlink physical channel may include a "use as PRS" indication. As another example, for a multi-layer downlink physical channel (for example, with MIMO, when "rank>1" is selected, i.e., using multiple spatial layers), the base station may provide a "use as PRS" indication per-layer (e.g., if different layers have different spatial QCL). This allows for more flexibility in specifying exactly which PDSCH can be used for positioning, at the cost of more overhead, i.e., presence of a "use as PRS" indicator in every scheduling DCI. To better control this overhead, the presence or absence of a "use as PRS" indication may be RRC-configurable, and may be limited to non-fallback DCI. The fallback DCI may have a fixed size that is not RRC configurable, and thus increase in this DCI size may be avoided by not including the "use as PRS" indicator within it.

To use a downlink physical channel as a PRS, the UE needs to be able to handle multiple time-instances of different types of positioning measurement signals. As such, the UE needs to be able to support time-averaging or other combining across instances (similar to combining across LTE PRS repetitions in successive slots). This averaging or combining may be done separately for different beam directions (transmit and/or receive beam directions). More specifically, the base station may not advertise the transmit beam information, bur rather, may only indicate when the same receive beam could be used (e.g., via the spatial QCL, i.e., QCL-D indications), and as such, the UE will only be able to use the receive beam directions. In addition, the UE should be able to handle the non-uniform/sporadic nature of downlink physical channels.

To address these issues, the present disclosure defines an "averaging duration" (e.g., a group of N slots) in which positioning measurements from all PRS (including downlink physical channels being used as PRS) with a given PRS-ID within that duration may be combined into a combined positioning measurement. The proposed averaging duration corresponds to a "PRS occasion group" in LTE. The PRS-ID can be used to indicate which PRS can be combined together. For example, the PRS-ID could be linked to other attributes of the signals, such as the receive (Rx) QCL (where each Rx QCL/beam receives a separate PRS-ID), physical resource block group (PRG) size of the downlink physical channel (e.g., one PRS-ID reserved for PDSCH transmissions consisting of a single PRG, and another PRS-ID for those with more than one PRG), or the downlink physical channel allocation bandwidth (which may be partitioned into thresholds and each given a different PRS-ID). In addition, different signal types (e.g., CSI-RS, PDSCH, PDCCH) may have the same or different PRS-ID. For example, different signal types may have the same PRS-ID if they have the same Rx QCL. Note that different averaging durations may have different numbers of PRS transmissions. Some may have multiple transmissions, some may have no transmissions at all, and some may have only one.

The positioning measurement report calculated based on PRS downlink physical channels may include the PRS-ID and the averaging duration index used. The averaging duration index may be based on the system frame number (SFN) and slot index within the frame. Alternatively, the averaging duration index may be based on sequentially counting "averaging durations" starting from when the PRS was configured. This can be used provided there is a precise start time for the PRS configuration, which is usually well-defined for DCI or MAC-CE based activation, but not for RRC-based activation. It could, however, be added to RRC activation command for this purpose.

Figure 7:
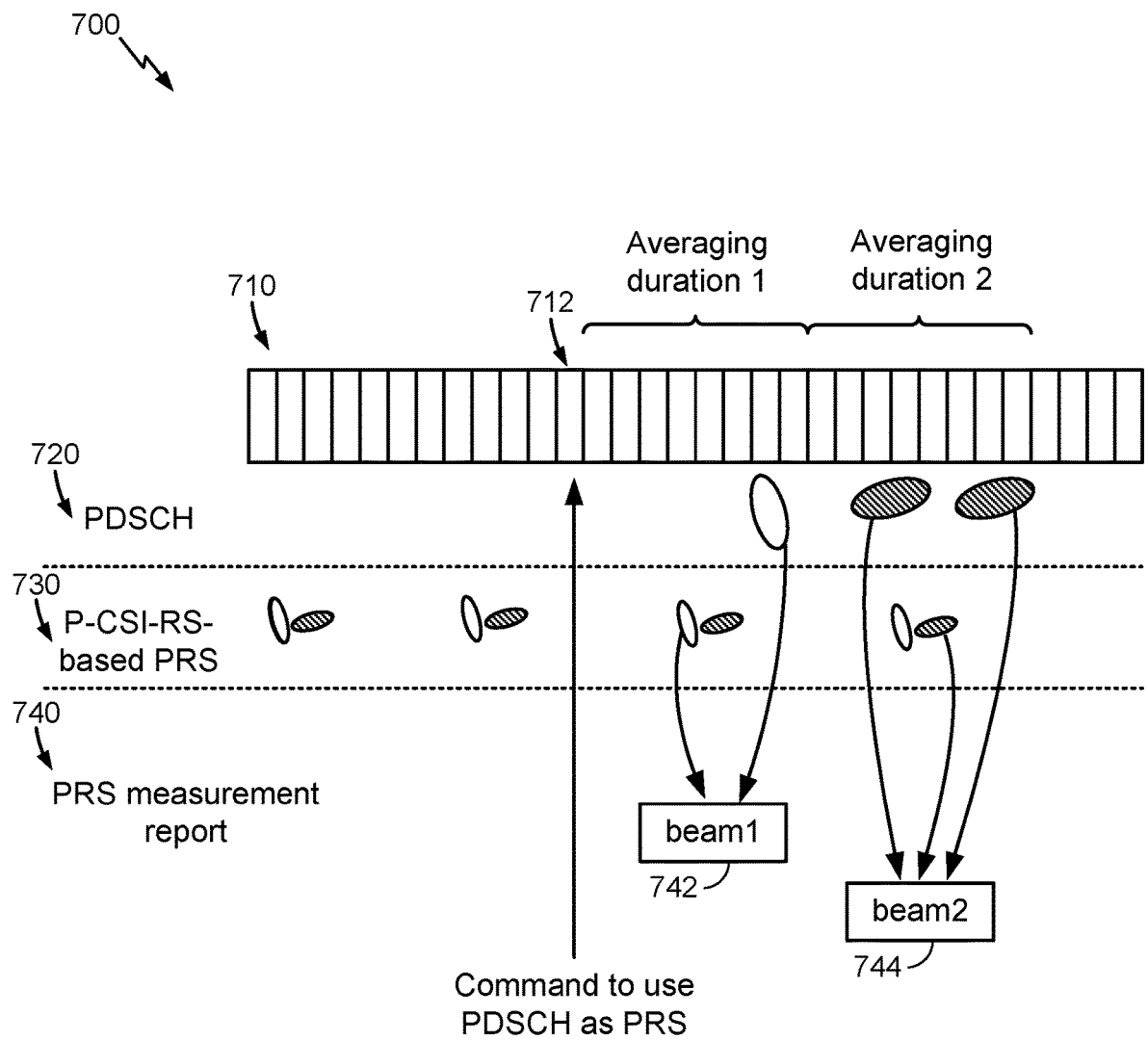
FIG. 7 is a timing diagram illustrating the use of a downlink physical channel as a positioning measurement signal according to an aspect of the disclosure.

FIG. 7 is a timing diagram 700 illustrating the use of a downlink physical channel as a PRS according to aspects of the disclosure. FIG. 7 illustrates a series of slots 710 (e.g., time slots 330) of one or more radio frames during which a UE (e.g., UE 550) may receive a downlink physical channel 720. In the example of FIG. 7, the downlink physical channel is a PDSCH, but as will be appreciated, it may be any other downlink physical channel, such as PDCCH. Also in the example of FIG. 7, the downlink physical channel 720 may carry periodic (P) CSI-RS-based PRS 730, but again, as will be appreciated, it may carry other physical signals that can be used as PRS, such as semi-persistent (SP) CSI-RS, SSB, SRS, and the like.

As illustrated in FIG. 7, the P-CSI-RS-based PRS 730 may be received periodically on different receive beams, illustrated as differently oriented and shaded ovals. As will be appreciated, the P-CSI-RS-based PRS 730 may be received on different receive beams because they were transmitted on different transmit beams, or because they were transmitted on the same transmit beam but experienced propagation delay between the transmitter (i.e., the base station) and the receiver (i.e., the UE) and therefore arrived at the UE from different directions, or because they were transmitted from different antenna panels which may be geographically separated, as in a remote radio head (RRH) deployment.

During a slot 712 of the series of slots 710, the UE receives an instruction from the base station transmitting the downlink physical channel 720 (e.g., PDSCH) to use the downlink physical channel 720 as a PRS. In response (e.g., starting at the next slot, although this is not necessary), the UE begins a first averaging duration, during which it performs positioning measurements of each instance of (e.g., resource element or block carrying) the downlink physical channel 720 and the P-CSI-RS-based PRS 730 received on a first receive beam of the two receive beams illustrated in FIG. 7 and usable for positioning (as illustrated by the ovals having the same orientation and fill pattern). In the example of FIG. 7, the first averaging duration may have a length of 8 slots (i.e., the first averaging duration is a group of 8 slots). Also in the example of FIG. 7, the base station may assign the downlink physical channel 720 and the P-CSI-RS-based PRS 730 received on the first receive beam the same PRS-ID because they are to be received on the same receive beam.

At the end of the first averaging duration, the UE begins a second averaging duration (e.g., starting at the first slot after the last slot of the first averaging duration), during which it performs positioning measurements of each instance of (e.g., resource element or block carrying) the downlink physical channel 720 and the P-CSI-RS-based PRS 730 received on the other receive beam and usable for positioning (as illustrated by the ovals having the same orientation and fill pattern). Like the first averaging duration, the second averaging duration may have a length of 8 slots (i.e., the second averaging duration is a group of 8 slots). In addition, the base station may assign the downlink physical channel 720 and the P-CSI-RS-based PRS 730 received on the second receive beam the same PRS-ID because they are to be received on the same receive beam.

The UE can then combine the measurements of the downlink physical channel 720 and the P-CSI-RS-based PRS 730 made during the two averaging durations. That is, the UE combines the measurements of the downlink physical channel 720 and the P-CSI-RS-based PRS 730 received on the first receive beam during the first averaging duration into a first combined positioning measurement, and combines the measurements of the downlink physical channel 720 and the P-CSI-RS-based PRS 730 received on the second receive beam during the second averaging duration into a second combined positioning measurement. The positioning measurements may be combined in different ways. For example, the UE may perform a joint channel estimation based on all the positioning signals in the averaging duration and compute a combined ToA based on the joint channel estimation. As another example, the UE may perform separate channel estimates, then average them and compute a combined positioning measurement using the computed average. As yet another example, the UE may compute separate positioning measurements and then average them.

The UE next sends a PRS measurement report 740 to the base station that transmitted the downlink physical channel 720 and the P-CSI-RS-based PRS 730, or to the network entity (e.g., a location server) with which it is performing the positioning session. The PRS measurement report 740 includes the average of the measurements taken of the first beam (represented by box 742) and the average of the measurements taken of the second beam (represented by box 744). It may also include the PRS-ID and the averaging duration index (e.g., the slot index of the slot during which the corresponding averaging duration began).

In an aspect, rather than the UE receiving an indication from the base station to use a downlink physical channel as a PRS and performing a positioning measurement of the downlink physical channel in response, as discussed above, the UE may instead receive an indication from the base station that the base station will transmit reference signals for positioning on the downlink physical channel. In response, the UE can perform a positioning measurement of a reference signal received on the downlink physical channel. The reference signal may be a DMRS and/or a PTRS. In addition, the UE, if so capable, may also use data modulation symbols carried on the downlink physical channel along with the reference signal for performing the positioning measurement.

Figure 8:
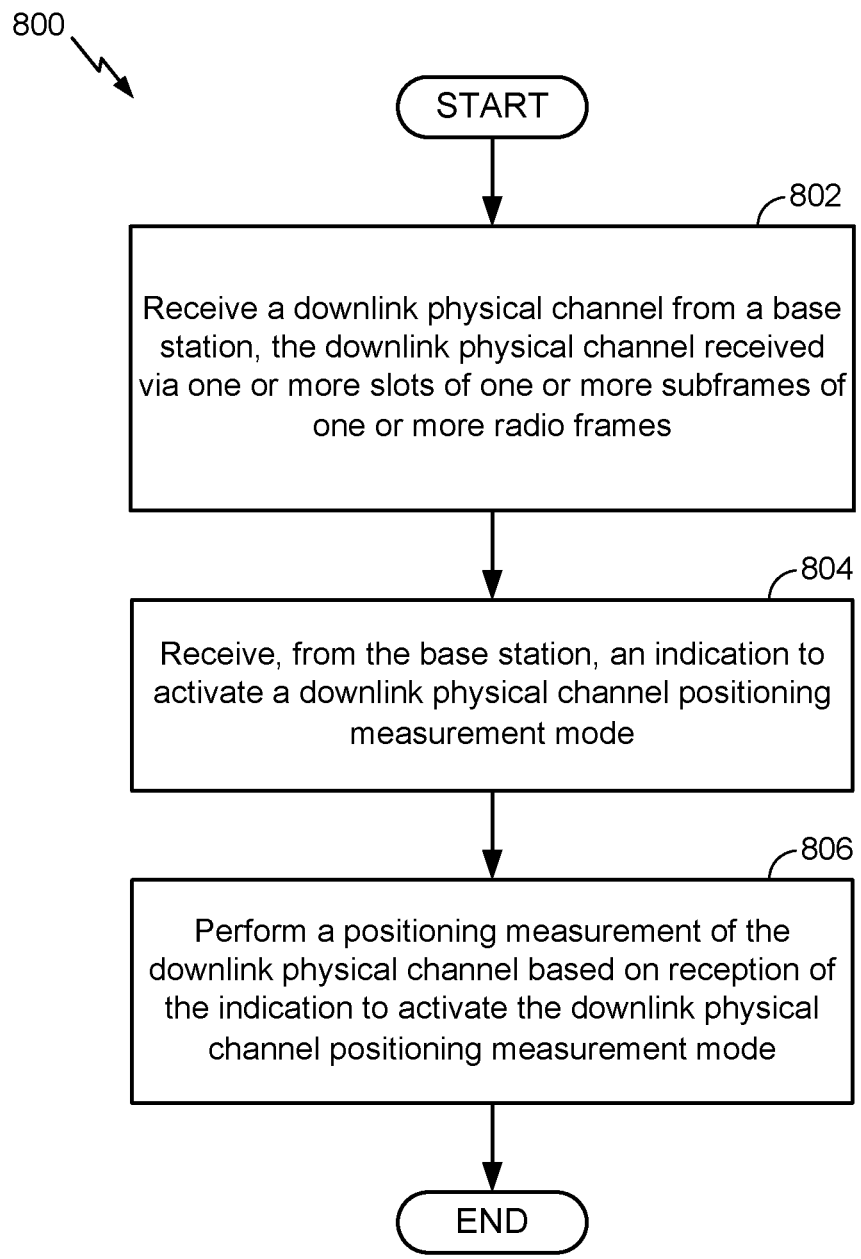
FIGS. 8-10 illustrate exemplary methods according to aspects of the disclosure.

FIG. 8 illustrates an exemplary method 800 for performing positioning operations, according to aspects of the disclosure. The method 800 may be performed by any of the UEs described above, such as UE 550.

At 802, the UE receives a downlink physical channel from a base station (e.g., base station 510), the downlink physical channel received via one or more slots of one or more subframes of one or more radio frames, as described above with reference to FIGS. 3 and 4A. In an aspect, the downlink physical channel is not a positioning reference signal, but rather, carries user data and/or control information from the base station to the UE. In an aspect, the downlink physical channel may be a PDCCH or a PDSCH. In an aspect, operation 802 may be performed by antenna(s) 552, demodulator(s) 554, MIMO detector 556, and/or receive processor 558 of the UE 550, any or all of which may be considered means for performing this operation.

At 804, the UE receives, from the base station, an indication to activate a downlink physical channel positioning measurement mode, as at 712 of FIG. 7. In an aspect, the indication may be a field in an RRC message indicating that the UE is to activate the downlink physical channel positioning measurement mode, a field in a MAC-CE indicating that the UE is to activate the downlink physical channel positioning measurement mode, or a field in a DCI indicating that the UE is to activate the downlink physical channel positioning measurement mode. In an aspect, the indication may be an indication in a DCI scheduling message to activate the downlink physical channel positioning measurement mode. In an aspect, the downlink physical channel may be a multi-layer downlink physical channel, and the indication may correspond to a layer of the downlink physical channel. In an aspect, operation 804 may be performed by antenna(s) 552, demodulator(s) 554, MIMO detector 556, and/or receive processor 558 of the UE 550, any or all of which may be considered means for performing this operation.

At 806, the UE performs a positioning measurement of the downlink physical channel based on reception of the indication to activate the downlink physical channel positioning measurement mode, as described above with reference to FIG. 7. In an aspect, the UE may perform positioning measurements of the downlink physical channel only during a pattern of the plurality of slots of the downlink physical channel. In an aspect, the pattern may be slots within a repeating time window, even slots or odd slots of the plurality of slots. In an aspect, the UE may perform positioning measurements of the downlink physical channel received only on predetermined receive beams. In an aspect, operation 806 may be performed by receive processor 558 and/or controller/processor 580 of the UE 550, any or all of which may be considered means for performing this operation.

Figure 9:
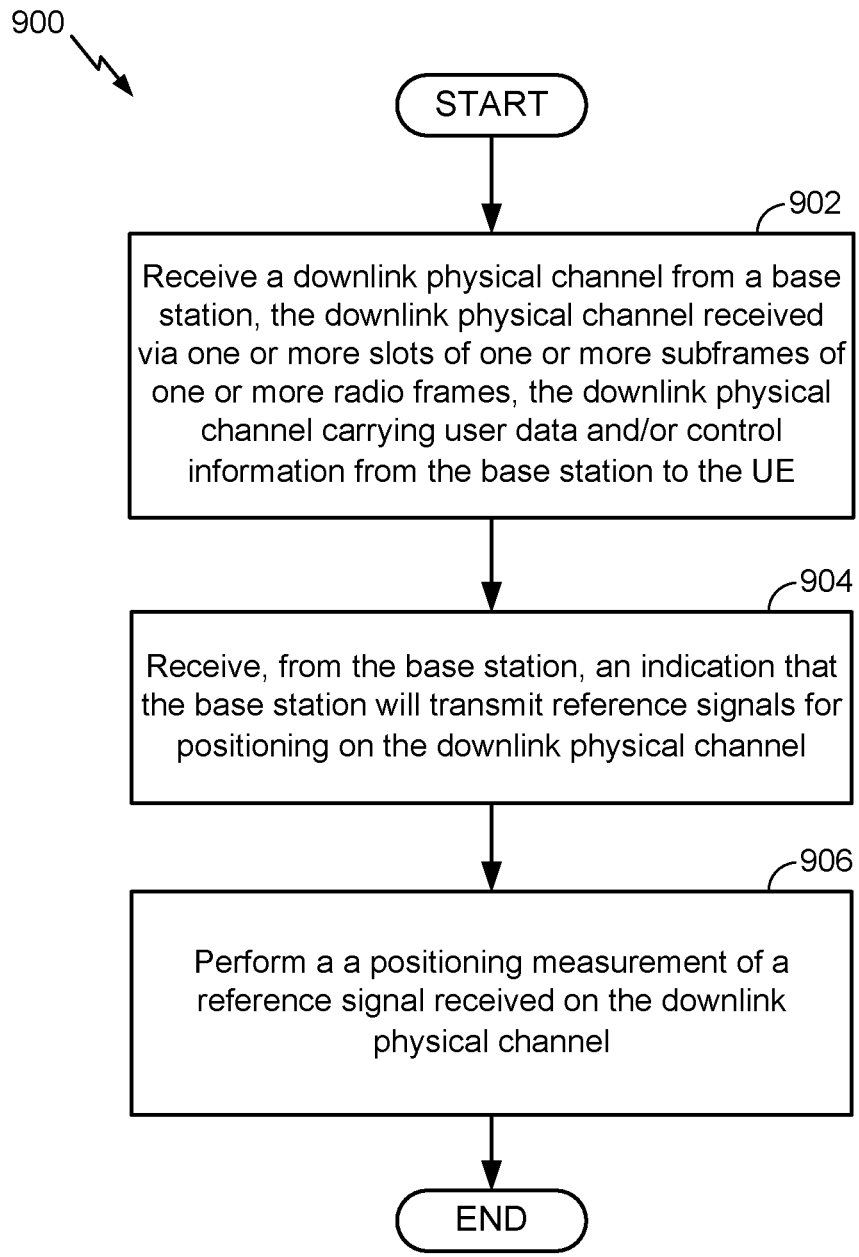

FIG. 9 illustrates an exemplary method 900 of performing positioning operations, according to aspects of the disclosure. The method 900 may be performed by any of the UEs described above, such as UE 550.

At 902, the UE receives a downlink physical channel from a base station (e.g., any of the base stations described above), the downlink physical channel received via one or more slots of one or more subframes of one or more radio frames, the downlink physical channel carrying user data and/or control information from the base station to the UE. In an aspect, the downlink physical channel comprises a PDCCH or a PDSCH. In an aspect, operation 902 may be performed by antenna(s) 552, demodulator(s) 554, MIMO detector 556, and/or receive processor 558 of the UE 550, any or all of which may be considered means for performing this operation.

At 904, the UE receives, from the base station, an indication that the base station will transmit reference signals for positioning on the downlink physical channel. In an aspect, the indication may be a field in a RRC message indicating that the base station will transmit reference signals for positioning on the downlink physical channel, a field in a MAC-CE indicating that the base station will transmit reference signals for positioning on the downlink physical channel, or a field in a DCI indicating that the base station will transmit reference signals for positioning on the downlink physical channel. In an aspect, the indication may be an indication in a DCI scheduling message that the base station will transmit reference signals for positioning on the downlink physical channel. In an aspect, the downlink physical channel may be a multi-layer downlink physical channel, and the indication may correspond to a layer of the downlink physical channel. In an aspect, operation 904 may be performed by antenna(s) 552, demodulator(s) 554, MIMO detector 556, and/or receive processor 558 of the UE 550, any or all of which may be considered means for performing this operation.

At 906, the UE performs a positioning measurement of a reference signal received on the downlink physical channel. In an aspect, the UE may perform positioning measurements of reference signals received on the downlink physical channel only during a pattern of the plurality of slots of the downlink physical channel. In an aspect, the pattern may be even slots or odd slots of the plurality of slots. In an aspect, the UE may perform positioning measurements of reference signals received on the downlink physical channel received only on predetermined receive beams. In an aspect, operation 906 may be performed by receive processor 558 and/or controller/processor 580 of the UE 550, any or all of which may be considered means for performing this operation.

Figure 10:
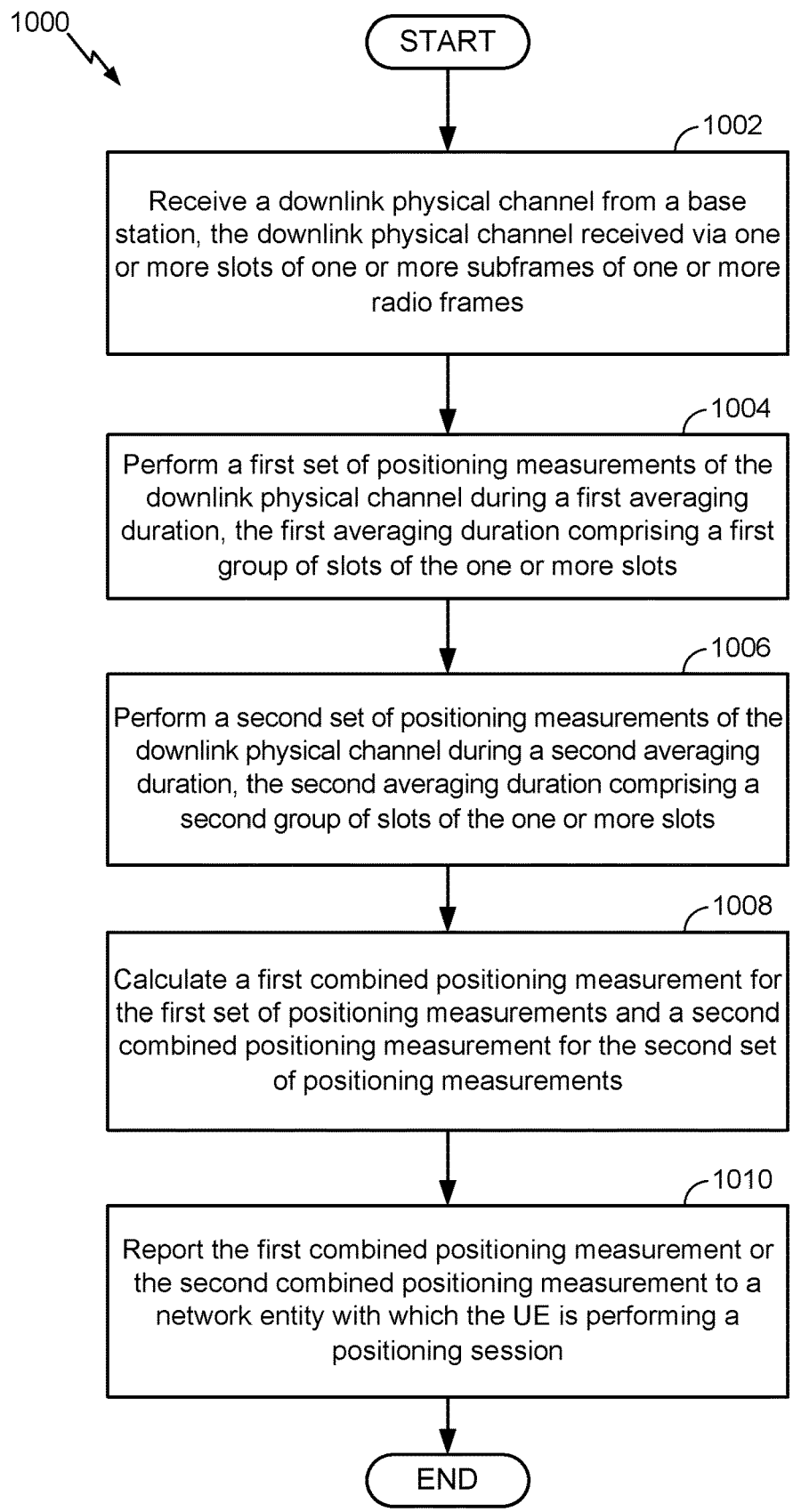

FIG. 10 illustrates an exemplary method 1000 for performing positioning operations according to an aspect of the disclosure. The method 1000 may be performed by any of the UEs described above, such as UE 550.

At 1002, the UE receives a downlink physical channel from a base station (e.g., base station 510), the downlink physical channel received via one or more slots of one or more subframes of one or more radio frames, as described above with reference to FIGS. 3 and 4A. In an aspect, the downlink physical channel is not a positioning reference signal, but rather, carries user data and/or control information from the base station to the UE. In an aspect, the downlink physical channel may be a PDCCH or a PDSCH. In an aspect, operation 1002 may be performed by antenna (s) 552, demodulator(s) 554, MIMO detector 556, and/or receive processor 558 of the UE 550, any or all of which may be considered means for performing this operation.

At 1004, the UE performs a first set of positioning measurements of the downlink physical channel during a first averaging duration, the first averaging duration comprising a first group of slots of the plurality of slots, as described above with reference to FIG. 7. In an aspect, operation 1004 may be performed by receive processor 558 and/or controller/processor 580 of the UE 550, any or all of which may be considered means for performing this operation.

At 1006, the UE performs a second set of positioning measurements of the downlink physical channel during a second averaging duration, the second averaging duration comprising a second group of slots of the plurality of slots, as described above with reference to FIG. 7. In an aspect, the first and second sets of positioning measurements may be ToA measurements. In an aspect, the first set of positioning measurements may include a first positioning measurement of the downlink physical channel and a first positioning measurement of a first positioning reference signal transmitted on the downlink physical channel during the first averaging duration, and the second set of positioning measurements may include a second positioning measurement of the downlink physical channel and a second positioning measurement of a second positioning reference signal transmitted on the downlink physical channel during the second averaging duration. In an aspect, the first set of positioning measurements may include positioning measurements of first downlink physical channel signals having a first positioning signal identity, and the second set of positioning measurements may include positioning measurements of second downlink physical channel signals having a second positioning signal identity. In that case, the first downlink physical channel signals may have the first positioning signal identity based on being received on a first receive beam of the UE, and the second downlink physical channel signals may have the second positioning signal identity based on being received on a second receive beam of the UE. Alternatively or additionally, the first downlink physical channel signals may have the first positioning signal identity based on being received on a first set of quasi-collocated antenna ports of the UE, and the second downlink physical channel signals may have the second positioning signal identity based on being received on a second set of quasi-collocated antenna ports of the UE. Alternatively or additionally, the first downlink physical channel signals may have the first positioning signal identity based on being a first type of signal, and the second downlink physical channel signals may have the second positioning signal identity based on being a second type of signal. In an aspect, the first type may be one of CSI-RS, PDCCH, or PDSCH, and the second type may be another one of CSI-RS, PDCCH, or PDSCH. Alternatively or additionally, the first downlink physical channel signals may have the first positioning signal identity based on being within a first bandwidth threshold of the downlink physical channel, and the second downlink physical channel signals may have the second positioning signal identity based on being within a second bandwidth threshold of the downlink physical channel. In an aspect, the first and second positioning signal identities may be the same positioning signal identity. Alternatively, the first and second positioning signal identities may be different positioning signal identities. In an aspect, operation 1006 may be performed by receive processor 558 and/or controller/processor 580 of the UE 550, any or all of which may be considered means for performing this operation.

At 1008, the UE calculates a first combined positioning measurement for the first set of positioning measurements of the downlink physical channel and a second combined positioning measurement for the second set of positioning measurements of the downlink physical channel, as described above with reference to FIG. 7. In an aspect, operation 1008 may be performed by receive processor 558 and/or controller/processor 580 of the UE 550, any or all of which may be considered means for performing this operation.

At 1010, the UE (e.g., transmit processor 564, TX MIMO processor 566, modulator(s) 554, and/or antenna(s) 552) reports the first combined positioning measurement and the second combined positioning measurement to a network entity with which the UE is performing a positioning session, as described above with reference to FIG. 7. In an aspect, operation 1004 may be performed by transmit processor 564, TX MIMO processor 566, modulator(s) 554, and/or antenna(s) 552 of the UE 550, any or all of which may be considered means for performing this operation.

In an aspect, the method 1000 may further include (not shown) receiving, at the UE from the base station, an indication to activate a downlink physical channel positioning measurement mode. In an aspect, the first group of slots of the first averaging duration may begin at the next slot after the indication is received, and the second group of slots of the second averaging duration may begin at the next slot after the first group of slots ends.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor (e.g., cache memory).

Accordingly, it will be appreciated that certain aspects of the disclosure can include a computer-readable medium embodying the methods described herein, such as the exemplary methods illustrated in FIGS. 8-10.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus for performing positioning operations, comprising:
    a transceiver of a user equipment (UE) configured to:
        receive a downlink physical channel from a base station, the downlink physical channel received on one or more slots of one or more subframes of one or more radio frames, the downlink physical channel carrying user data and/or control information from the base station to the UE, the downlink physical channel comprising a physical downlink control channel (PDCCH) or a physical downlink shared channel (PDSCH);
        receive, from the base station, an indication in a downlink control information (DCI) scheduling message that the base station will transmit reference signals for positioning via the downlink physical channel; and
        perform a positioning measurement of a reference signal received via the downlink physical channel.

2. The apparatus of claim 1, wherein the UE performs positioning measurements of reference signals received on the downlink physical channel only during a pattern of the one or more slots of the downlink physical channel.

3. The apparatus of claim 2, wherein the pattern comprises slots within a repeating time window, even slots, or odd slots of the one or more slots.

4. The apparatus of claim 1, wherein the UE performs positioning measurements of reference signals received on the downlink physical channel received only on predetermined receive beams.

5. The apparatus of claim 1, wherein the downlink physical channel comprises a multi-layer downlink physical channel, and wherein the indication corresponds to a layer of the downlink physical channel.

6. An apparatus for performing positioning operations, comprising:
    a transceiver of a user equipment (UE) configured to:
        receive, from a base station, an indication in a downlink control information (DCI) scheduling message that the base station will transmit reference signals for positioning via a downlink physical channel;
        receive the downlink physical channel from the base station, the downlink physical channel received via one or more slots of one or more subframes of one or more radio frames, the downlink physical channel carrying user data and/or control information from the base station to the UE, the downlink physical channel comprising a physical downlink control channel (PDCCH) or a physical downlink shared channel (PDSCH);
        perform a first set of positioning measurements of the downlink physical channel during a first averaging duration, the first averaging duration comprising a first group of slots of the one or more slots; and
        perform a second set of positioning measurements of the downlink physical channel during a second averaging duration, the second averaging duration comprising a second group of slots of the one or more slots; and
    at least one processor of the UE configured to:
        calculate a first combined positioning measurement for the first set of positioning measurements of the downlink physical channel and a second combined positioning measurement for the second set of positioning measurements of the downlink physical channel; and
        cause the transceiver to report the first combined positioning measurement or the second combined positioning measurement to a network entity with which the UE is performing a positioning session.

7. The apparatus of claim 6, wherein:
the first set of positioning measurements comprises a first positioning measurement of the downlink physical channel and a first positioning measurement of a first positioning reference signal transmitted on the downlink physical channel during the first averaging duration, and
the second set of positioning measurements comprises a second positioning measurement of the downlink physical channel and a second positioning measurement of a second positioning reference signal transmitted on the downlink physical channel during the second averaging duration.

8. The apparatus of claim 6, wherein:
the first set of positioning measurements comprises positioning measurements of first downlink physical channel signals having a first positioning signal identity, and the second set of positioning measurements comprises positioning measurements of second downlink physical channel signals having a second positioning signal identity.

9. The apparatus of claim 8, wherein:
the first downlink physical channel signals have the first positioning signal identity based on being received on a first receive beam of the UE, and
the second downlink physical channel signals have the second positioning signal identity based on being received on a second receive beam of the UE.

10. The apparatus of claim 8, wherein:
the first downlink physical channel signals have the first positioning signal identity based on being received on a first set of quasi-collocated antenna ports of the UE, and
the second downlink physical channel signals have the second positioning signal identity based on being received on a second set of quasi-collocated antenna ports of the UE.

11. The apparatus of claim 8, wherein:
the first downlink physical channel signals have the first positioning signal identity based on being a first type of signal, and
the second downlink physical channel signals have the second positioning signal identity based on being a second type of signal.

12. The apparatus of claim 11, wherein the first type is one of channel state information reference signals (CSI-RS), PDCCH, or PDSCH, and the second type is another one of CSI-RS, PDCCH, or PDSCH.

13. The apparatus of claim 8, wherein:
the first downlink physical channel signals have the first positioning signal identity based on being within a first bandwidth threshold of the downlink physical channel, and
the second downlink physical channel signals have the second positioning signal identity based on being within a second bandwidth threshold of the downlink physical channel.

14. The apparatus of claim 8, wherein the first and second positioning signal identities are the same positioning signal identity.

15. The apparatus of claim 8, wherein the first and second positioning signal identities are different positioning signal identities.

16. The apparatus of claim 6, wherein the transceiver is further configured to:
receive, from the base station, an indication to activate a downlink physical channel positioning measurement mode.

17. The apparatus of claim 16, wherein the first group of slots of the first averaging duration begins at the next slot after the indication is received, and wherein the second group of slots of the second averaging duration begins at the next slot after the first group of slots ends.

18. The apparatus of claim 6, wherein the first and second sets of positioning measurements comprises Time of Arrival (ToA) measurements.

19. A method of performing positioning operations performed by a user equipment (UE), comprising:
receiving a downlink physical channel from a base station, the downlink physical channel received via one or more slots of one or more subframes of one or more radio frames, the downlink physical channel carrying user data and/or control information from the base station to the UE, the downlink physical channel comprising a physical downlink control channel (PDCCH) or a physical downlink shared channel (PDSCH);
receiving, from the base station, an indication in a downlink control information (DCI) scheduling message to activate a downlink physical channel positioning measurement mode; and
performing a positioning measurement of the downlink physical channel based on reception of the indication to activate the downlink physical channel positioning measurement mode.

20. A method for performing positioning operations performed by a user equipment (UE), comprising:
receiving, from a base station, an indication in a downlink control information (DCI) scheduling message that the base station will transmit reference signals for positioning via a downlink physical channel;
receiving the downlink physical channel from the base station, the downlink physical channel received via one or more slots of one or more subframes of one or more radio frames, the downlink physical channel carrying user data and/or control information from the base station to the UE, the downlink physical channel comprising a physical downlink control channel (PDCCH) or a physical downlink shared channel (PDSCH);
performing a first set of positioning measurements of the downlink physical channel during a first averaging duration, the first averaging duration comprising a first group of slots of the one or more slots;
performing a second set of positioning measurements of the downlink physical channel during a second averaging duration, the second averaging duration comprising a second group of slots of the one or more slots;
calculating a first combined positioning measurement for the first set of positioning measurements of the downlink physical channel and a second combined positioning measurement for the second set of positioning measurements of the downlink physical channel; and
reporting the first combined positioning measurement or the second combined positioning measurement to a network entity with which the UE is performing a positioning session.

21. The method of claim 20, wherein:
the first set of positioning measurements comprises a first positioning measurement of the downlink physical channel and a first positioning measurement of a first positioning reference signal transmitted on the downlink physical channel during the first averaging duration, and
the second set of positioning measurements comprises a second positioning measurement of the downlink physical channel and a second positioning measurement of a second positioning reference signal transmitted on the downlink physical channel during the second averaging duration.

22. The method of claim 20, wherein:
the first set of positioning measurements comprises positioning measurements of first downlink physical channel signals having a first positioning signal identity, and
the second set of positioning measurements comprises positioning measurements of second downlink physical channel signals having a second positioning signal identity.

23. The method of claim 22, wherein:
the first downlink physical channel signals have the first positioning signal identity based on being received on a first receive beam of the UE, and the second downlink physical channel signals have the second positioning signal identity based on being received on a second receive beam of the UE.

24. The method of claim 22, wherein:
the first downlink physical channel signals have the first positioning signal identity based on being received on a first set of quasi-collocated antenna ports of the UE, and
the second downlink physical channel signals have the second positioning signal identity based on being received on a second set of quasi-collocated antenna ports of the UE.

25. The method of claim 22, wherein:
the first downlink physical channel signals have the first positioning signal identity based on being a first type of signal, and
the second downlink physical channel signals have the second positioning signal identity based on being a second type of signal.

* * * * *